(12) United States Patent
Vallius et al.

(10) Patent No.: US 10,108,014 B2
(45) Date of Patent: Oct. 23, 2018

(54) WAVEGUIDE DISPLAY WITH MULTIPLE FOCAL DEPTHS

(71) Applicant: Microsoft Technology Licensing, LLC, Redmond, WA (US)

(72) Inventors: Tuomas Vallius, Espooo (FI); Mikko Antton Juhola, Muurla (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/402,904

(22) Filed: Jan. 10, 2017

(65) Prior Publication Data

US 2018/0196263 A1 Jul. 12, 2018

(51) Int. Cl.
*G02B 27/01* (2006.01)
*G02F 1/295* (2006.01)
*G02F 1/29* (2006.01)

(52) U.S. Cl.
CPC ......... *G02B 27/0172* (2013.01); *G02F 1/295* (2013.01); *G02B 2027/014* (2013.01); *G02B 2027/0138* (2013.01); *G02B 2027/0141* (2013.01); *G02B 2027/0178* (2013.01); *G02F 2001/291* (2013.01); *G02F 2001/294* (2013.01); *G02F 2201/302* (2013.01); *G02F 2201/305* (2013.01); *G02F 2203/22* (2013.01)

(58) Field of Classification Search
USPC .......................................... 345/156, 170–179
See application file for complete search history.

(56) References Cited

U.S. PATENT DOCUMENTS 3,980,883 A * 9/1976 Franks ..................... G21K 1/06
378/145
5,061,025 A * 10/1991 Debesis ............... G02B 26/106
359/18
5,218,471 A * 6/1993 Swanson ................... G02B 3/08
359/565
5,224,198 A * 6/1993 Jachimowicz ......... G02B 6/003
359/13
5,340,637 A * 8/1994 Okai ..................... G02B 5/1857
359/290
5,596,671 A    1/1997 Rockwell
(Continued)

OTHER PUBLICATIONS

Kim, et al., "Viewing-angle-enhanced integral imaging system using a curved lens array", In Journal of Optics Express, vol. 12, Issue 3, Feb. 9, 2004, pp. 421-429. (9 pages total).
(Continued)

*Primary Examiner* — Tony Davis
(74) *Attorney, Agent, or Firm* — Mark K. Young; Mayer & Williams PC

(57) ABSTRACT

A near-eye optical display system utilized in augmented reality devices includes a see-through waveguide display having optical elements configured for in-coupling virtual images from an imager, exit pupil expansion, and out-coupling virtual images with expanded pupil to the user's eye. The near-eye optical display system further includes a curved two-sided array of electrically-activated tunable liquid crystal (LC) microlenses that is located between the waveguide and the user's eye. The LC microlenses are distributed in layers on each side of the two-sided array. Each pixel in the waveguide display is mapped to an LC microlens in the array, and multiple nearby pixels may be mapped to the same LC microlens. A region of the waveguide display that the user is gazing upon is detected and the LC microlens that is mapped to that region may be electrically activated to thereby individually shape the wavefront of each pixel in a virtual image.

19 Claims, 17 Drawing Sheets

(56) References Cited

U.S. PATENT DOCUMENTS

| | | | | |
|---|---|---|---|---|
| 5,907,427 | A * | 5/1999 | Scalora | B82Y 20/00 359/248 |
| 6,046,541 | A * | 4/2000 | Valliath | H01J 29/864 313/258 |
| 6,147,725 | A * | 11/2000 | Yuuki | G02B 6/0036 349/61 |
| 6,232,044 | B1 * | 5/2001 | Gibbons | G02B 26/04 250/347 |
| 6,259,561 | B1 * | 7/2001 | George | G02B 5/0221 359/566 |
| 6,410,213 | B1 * | 6/2002 | Raguin | G03F 7/001 430/321 |
| 6,462,795 | B1 | 10/2002 | Clarke | |
| 6,700,552 | B2 * | 3/2004 | Kollin | G02B 26/101 345/7 |
| 6,833,956 | B2 * | 12/2004 | Lee | G02B 5/1842 359/2 |
| 6,873,463 | B2 * | 3/2005 | Nakai | G02B 5/1814 359/565 |
| 6,909,546 | B2 * | 6/2005 | Hirai | G02B 27/09 359/565 |
| 6,950,227 | B2 * | 9/2005 | Schrader | G02B 26/001 359/290 |
| 6,990,275 | B2 * | 1/2006 | Kersten | G02B 6/12004 385/129 |
| 7,082,236 | B1 | 7/2006 | Moore | |
| 7,123,415 | B2 * | 10/2006 | Mercer | G02B 5/18 359/569 |
| 7,129,028 | B2 * | 10/2006 | Koeda | G01J 3/1838 430/325 |
| 7,224,854 | B2 * | 5/2007 | Ellwood, Jr. | G02B 6/02 385/11 |
| 7,236,251 | B2 * | 6/2007 | Takaoka | G01N 21/4795 356/479 |
| 7,339,738 | B1 * | 3/2008 | Carr | G02B 5/1828 359/291 |
| 7,391,524 | B1 * | 6/2008 | Chen | G01B 11/24 356/625 |
| 7,483,604 | B2 * | 1/2009 | Levola | G02B 5/1842 359/566 |
| 7,492,517 | B2 * | 2/2009 | McGrew | G02B 5/1828 359/489.01 |
| 7,525,672 | B1 * | 4/2009 | Chen | G01B 11/02 250/559.22 |
| 7,565,041 | B2 * | 7/2009 | Little | G02B 6/12007 385/11 |
| 7,576,866 | B2 * | 8/2009 | Ohkubo | G01N 21/21 356/479 |
| 7,627,018 | B1 * | 12/2009 | Guilfoyle | G02B 6/4214 372/102 |
| 7,667,783 | B2 | 2/2010 | Hong et al. | |
| 7,710,628 | B2 * | 5/2010 | Morizono | B41J 2/465 347/135 |
| 7,719,675 | B2 * | 5/2010 | Grygier | G03H 1/22 356/300 |
| 7,738,746 | B2 * | 6/2010 | Charters | G02B 6/12004 345/173 |
| 7,922,339 | B2 | 4/2011 | Sokolov et al. | |
| 7,959,308 | B2 * | 6/2011 | Freeman | G02B 5/1814 353/122 |
| 7,981,591 | B2 * | 7/2011 | Li | G02B 6/124 430/314 |
| 8,152,307 | B2 * | 4/2012 | Duelli | G02B 27/48 353/38 |
| 8,208,191 | B2 * | 6/2012 | Gan | G02B 5/008 359/237 |
| 8,233,204 | B1 * | 7/2012 | Robbins | G02B 5/1828 345/7 |
| 8,376,548 | B2 * | 2/2013 | Schultz | G02B 5/32 349/11 |
| 8,463,080 | B1 * | 6/2013 | Anderson | G02F 1/1396 385/3 |
| 8,467,133 | B2 | 6/2013 | Miller | |
| 8,488,246 | B2 * | 7/2013 | Border | G02B 27/017 353/28 |
| 8,579,492 | B2 * | 11/2013 | Epstein | G02B 5/021 349/62 |
| 8,582,209 | B1 | 11/2013 | Amirparviz | |
| 8,675,182 | B2 * | 3/2014 | Bamji | G01S 7/497 356/3.01 |
| 8,699,137 | B2 * | 4/2014 | McGrew | G02B 5/1828 359/572 |
| 8,736,963 | B2 * | 5/2014 | Robbins | G02B 27/144 359/629 |
| 8,749,796 | B2 * | 6/2014 | Pesach | G01B 11/25 356/610 |
| 8,792,169 | B2 * | 7/2014 | Jiang | C23C 14/028 359/566 |
| 9,671,615 | B1 * | 6/2017 | Vallius | G02B 27/4205 |
| 2001/0015851 | A1 * | 8/2001 | Danziger | G02B 5/1876 359/575 |
| 2001/0033716 | A1 * | 10/2001 | Fukutomi | G02B 6/12004 385/49 |
| 2001/0036012 | A1 * | 11/2001 | Nakai | G02B 5/1823 359/569 |
| 2002/0080491 | A1 * | 6/2002 | Goto | G02B 5/1866 359/566 |
| 2002/0126390 | A1 | 9/2002 | Matsushita et al. | |
| 2003/0107787 | A1 * | 6/2003 | Bablumyan | G02B 6/02085 359/15 |
| 2004/0170356 | A1 * | 9/2004 | Iazikov | G02B 5/203 385/37 |
| 2004/0184147 | A1 * | 9/2004 | Parikka | G02B 1/11 359/487.01 |
| 2004/0218172 | A1 * | 11/2004 | DeVerse | G01J 3/2823 356/300 |
| 2004/0233534 | A1 * | 11/2004 | Nakanishi | G02B 5/1809 359/572 |
| 2005/0002611 | A1 * | 1/2005 | Levola | G02B 6/105 385/37 |
| 2005/0180674 | A1 * | 8/2005 | Ellwood, Jr. | G02F 1/093 385/6 |
| 2005/0189315 | A1 * | 9/2005 | Knight | H01S 5/12 216/2 |
| 2006/0056028 | A1 * | 3/2006 | Wildnauer | G02B 5/1809 359/575 |
| 2007/0008624 | A1 * | 1/2007 | Hirayama | G02B 27/0081 359/630 |
| 2007/0188837 | A1 * | 8/2007 | Shimizu | G02B 5/203 359/13 |
| 2007/0201795 | A1 * | 8/2007 | Rice | H01S 3/005 385/39 |
| 2007/0242253 | A1 * | 10/2007 | Visser | G03F 7/70058 355/67 |
| 2007/0291362 | A1 * | 12/2007 | Hill | G02B 5/1842 359/567 |
| 2008/0043334 | A1 * | 2/2008 | Itzkovitch | G02B 5/1814 359/569 |
| 2008/0138013 | A1 * | 6/2008 | Parriaux | G02B 5/1814 385/37 |
| 2008/0212921 | A1 * | 9/2008 | Gaylord | B82Y 20/00 385/14 |
| 2008/0297731 | A1 * | 12/2008 | Powell | G03B 21/26 353/37 |
| 2009/0009486 | A1 * | 1/2009 | Sato | G02F 1/13338 345/174 |
| 2009/0040607 | A1 * | 2/2009 | Amako | G02B 5/1809 359/485.01 |
| 2009/0128911 | A1 * | 5/2009 | Itzkovitch | G02B 5/1866 359/575 |
| 2009/0180166 | A1 * | 7/2009 | Hefetz | G02B 5/32 359/16 |
| 2009/0245730 | A1 * | 10/2009 | Kleemann | G02B 5/1861 385/37 |
| 2009/0257106 | A1 * | 10/2009 | Tan | G02B 27/48 359/279 |
| 2009/0303599 | A1 * | 12/2009 | Levola | G02B 27/0081 359/567 |

(56) References Cited

U.S. PATENT DOCUMENTS

| | | | |
|---|---|---|---|
| 2010/0079865 A1* | 4/2010 | Saarikko | G02B 6/0016 359/566 |
| 2010/0134534 A1* | 6/2010 | Seesselberg | G02B 6/0038 345/690 |
| 2010/0149073 A1* | 6/2010 | Chaum | G02B 27/0093 345/8 |
| 2010/0177388 A1* | 7/2010 | Cohen | G02B 6/0038 359/566 |
| 2010/0231693 A1* | 9/2010 | Levola | G02B 27/0081 348/51 |
| 2010/0232016 A1* | 9/2010 | Landa | G02B 5/1814 359/466 |
| 2010/0277803 A1* | 11/2010 | Pockett | G02B 27/0172 359/567 |
| 2010/0284085 A1* | 11/2010 | Laakkonen | G02B 6/12007 359/575 |
| 2010/0289870 A1 | 11/2010 | Leister | |
| 2010/0296163 A1* | 11/2010 | Saarikko | G02B 5/1814 359/567 |
| 2010/0315719 A1* | 12/2010 | Saarikko | G02B 27/0081 359/630 |
| 2010/0321781 A1* | 12/2010 | Levola | G02B 27/0081 359/569 |
| 2011/0002143 A1* | 1/2011 | Saarikko | B29D 11/00663 362/611 |
| 2011/0019874 A1* | 1/2011 | Jarvenpaa | A61B 3/113 382/103 |
| 2011/0038049 A1* | 2/2011 | Vallius | G02B 5/1809 359/575 |
| 2011/0096401 A1* | 4/2011 | Levola | G02B 6/0016 359/573 |
| 2011/0115733 A1* | 5/2011 | Shih | G06F 3/0412 345/173 |
| 2011/0261366 A1* | 10/2011 | Tearney | A61B 5/0066 356/479 |
| 2012/0019647 A1* | 1/2012 | Kempe | G01B 9/04 348/79 |
| 2012/0075168 A1* | 3/2012 | Osterhout | G02B 27/017 345/8 |
| 2012/0120365 A1* | 5/2012 | Legerton | G02B 27/0172 351/159.02 |
| 2012/0224062 A1* | 9/2012 | Lacoste | G01C 21/365 348/148 |
| 2013/0051730 A1* | 2/2013 | Travers | G02B 27/01 385/37 |
| 2013/0077049 A1* | 3/2013 | Bohn | G02B 5/20 351/210 |
| 2013/0100362 A1* | 4/2013 | Saeedi | G02B 5/30 349/11 |
| 2013/0135193 A1* | 5/2013 | Fike, III | G02B 26/00 345/156 |
| 2013/0242392 A1* | 9/2013 | Amirparviz | G02B 27/0172 359/485.05 |
| 2013/0250430 A1* | 9/2013 | Robbins | G02B 27/0172 359/633 |
| 2013/0261782 A1* | 10/2013 | Becken | G02C 7/02 700/95 |
| 2013/0314793 A1* | 11/2013 | Robbins | G02B 5/18 359/573 |
| 2013/0322810 A1* | 12/2013 | Robbins | G02B 5/30 385/11 |
| 2014/0002608 A1* | 1/2014 | Atwell | G01B 5/008 348/46 |
| 2014/0003762 A1 | 1/2014 | Macnamara | |
| 2014/0043689 A1* | 2/2014 | Mason | G02B 27/0101 359/630 |
| 2014/0104665 A1* | 4/2014 | Popovich | G02B 27/0081 359/15 |
| 2014/0118829 A1 | 5/2014 | Ma et al. | |
| 2014/0140654 A1* | 5/2014 | Brown | G02F 1/29 385/10 |
| 2014/0168167 A1* | 6/2014 | Chou | G06K 9/00026 345/175 |
| 2014/0168260 A1* | 6/2014 | O'Brien | G09G 5/377 345/633 |
| 2014/0168783 A1 | 6/2014 | Luebke et al. | |
| 2014/0185142 A1* | 7/2014 | Gupta | G02B 27/1086 359/630 |
| 2014/0217385 A1* | 8/2014 | Gaertner | G02B 5/0242 257/40 |
| 2014/0240613 A1* | 8/2014 | Bohn | G02B 27/0172 349/11 |
| 2014/0240834 A1* | 8/2014 | Mason | G02B 27/0081 359/567 |
| 2014/0240843 A1* | 8/2014 | Kollin | G02B 27/0172 359/633 |
| 2014/0293434 A1* | 10/2014 | Cheng | G02B 27/225 359/630 |
| 2014/0300695 A1* | 10/2014 | Smalley | G02F 1/011 348/40 |
| 2015/0034591 A1* | 2/2015 | Vink | G02B 5/008 216/24 |
| 2015/0083917 A1* | 3/2015 | Wyrwas | G01J 1/42 250/341.1 |
| 2015/0092042 A1* | 4/2015 | Fursich | B60R 1/00 348/115 |
| 2015/0108479 A1* | 4/2015 | Brinkley | H01L 27/1218 257/59 |
| 2015/0185475 A1* | 7/2015 | Saarikko | G02B 6/02085 382/117 |
| 2015/0234477 A1* | 8/2015 | Abovitz | G06K 9/00671 382/103 |
| 2015/0234491 A1* | 8/2015 | Liu | G06F 1/1626 345/174 |
| 2015/0277116 A1* | 10/2015 | Richards | G02B 27/0103 359/13 |
| 2015/0331544 A1* | 11/2015 | Bergstrom | G06F 3/0428 345/175 |
| 2015/0355394 A1* | 12/2015 | Valera | G02B 5/1828 359/571 |
| 2015/0382465 A1* | 12/2015 | Steyn | H05K 1/0274 361/783 |
| 2016/0018637 A1* | 1/2016 | Sparks | G02B 26/04 345/690 |
| 2016/0026253 A1* | 1/2016 | Bradski | G02B 27/225 345/8 |
| 2016/0116739 A1* | 4/2016 | TeKolste | G02B 27/0172 385/36 |
| 2016/0231570 A1* | 8/2016 | Levola | G02B 27/0172 |
| 2016/0234485 A1* | 8/2016 | Robbins | H04N 13/0429 |
| 2016/0291405 A1* | 10/2016 | Frisken | G02F 1/133504 |
| 2016/0327789 A1* | 11/2016 | Klug | G02B 27/0101 |
| 2016/0334635 A1* | 11/2016 | Ushigome | G02B 27/4272 |
| 2017/0003504 A1* | 1/2017 | Vallius | G02B 27/0101 |
| 2017/0003505 A1* | 1/2017 | Vallius | G02B 5/1819 |
| 2017/0031171 A1* | 2/2017 | Vallius | G02B 5/1819 |
| 2017/0034435 A1* | 2/2017 | Vallius | H04N 5/23229 |
| 2017/0059879 A1* | 3/2017 | Vallius | G02B 27/4205 |
| 2017/0102543 A1* | 4/2017 | Vallius | G02B 27/0172 |
| 2017/0102544 A1* | 4/2017 | Vallius | G02B 27/0172 |
| 2017/0123208 A1* | 5/2017 | Vallius | G02B 27/0172 |
| 2017/0124928 A1* | 5/2017 | Edwin | G01B 11/14 |
| 2017/0131460 A1* | 5/2017 | Lin | G02B 6/0026 |
| 2017/0131545 A1* | 5/2017 | Wall | G02B 27/0101 |
| 2017/0131546 A1* | 5/2017 | Woltman | G02B 5/1866 |
| 2017/0131551 A1* | 5/2017 | Robbins | G02B 5/1828 |
| 2017/0139210 A1* | 5/2017 | Vallius | G02B 27/0172 |

OTHER PUBLICATIONS

Hedili, et al., "Transmission characteristics of a bidirectional transparent screen based on reflective microlenses", In Journal of Optics Express, vol. 21, Issue 21, Oct. 8, 2013, pp. 24636-24646. (11 pages total).

* cited by examiner

WAVEGUIDE DISPLAY WITH MULTIPLE FOCAL DEPTHS

BACKGROUND

Augmented reality computing devices, such as head mounted display (HMD) systems and handheld mobile devices (e.g. smart phones, tablet computers, etc.), may be configured to display information to a user about virtual and/or real objects in a field of view of the user and/or a field of view of a camera of the device. For example, an HMD device may be configured to display, using a see-through display system, virtual environments with real-world objects mixed in, or real-world environments with virtual objects mixed in. Similarly, a mobile device may display such information using a camera viewfinder window.

SUMMARY

A near-eye optical display system that may be utilized in augmented reality applications and devices includes a see-through waveguide display having optical elements configured for in-coupling virtual images from an imager, exit pupil expansion, and out-coupling virtual images with expanded pupil to the user's eye. The near-eye optical display system further includes a curved two-sided array of electrically-activated tunable liquid crystal (LC) microlenses that is located between the waveguide and the user's eye. The LC microlenses may be grouped in hexagonal packages and multiple packages can be distributed in a layer on each side of the two-sided array. Each pixel in the waveguide display is mapped to an LC microlens in the array, and multiple nearby pixels may be mapped to the same LC microlens. The layers of LC microlenses are spatially offset, for example, by a half lens diameter to provide sufficient microlens density to map all the pixels in the waveguide display. A region of the waveguide display that the user is gazing upon is detected and the LC microlenses that is mapped to that region may be electrically activated to thereby individually shape the wavefront of each pixel in a virtual image.

The individual wavefront shaping enables multiple focal depths to be selectively implemented for virtual images on a per-pixel basis. Virtual images can appear in focus to the user in virtual image planes that are placed at different distances from the user. By activating LC microlenses in the array only at the waveguide display locations providing the virtual images, the real-world images observed through the see-through waveguide are unaffected. Thus, virtual images can be placed at different focal depths to enhance the quality and immersion of the augmented reality user experience while reducing the discomfort that can otherwise occur when virtual images are displayed at a fixed focal depth. The combination of waveguide display and LC microlens array thus essentially functions as a near-eye light field display.

Light out-coupled by the waveguide display takes the form of a plane wave which can cause edge effects including boundary diffraction, absorption, and optical aberrations, particularly at the interfaces between adjacent and/or overlapping LC microlenses in the array. These effects can reduce image quality when multiple microlenses are simultaneously activated because each pixel out-coupled from the waveguide display results in multiple wavefronts reaching the user's eye from the LC microlens array. To compensate for these effects, a raster scanning approach may be utilized in which, for example, adjacent pixels are scanned sequentially or in some other scanning order (every second, third, fourth pixel, etc.) and the LC microlenses in respective layers of the array are switched on and off as appropriate. In this way, simultaneous activation of overlapping LC microlenses is avoided and the edge effects which would otherwise negatively impact image quality are reduced or eliminated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

Like reference numerals indicate like elements in the drawings. Elements are not drawn to scale unless otherwise indicated.

DETAILED DESCRIPTION

Figure 1:
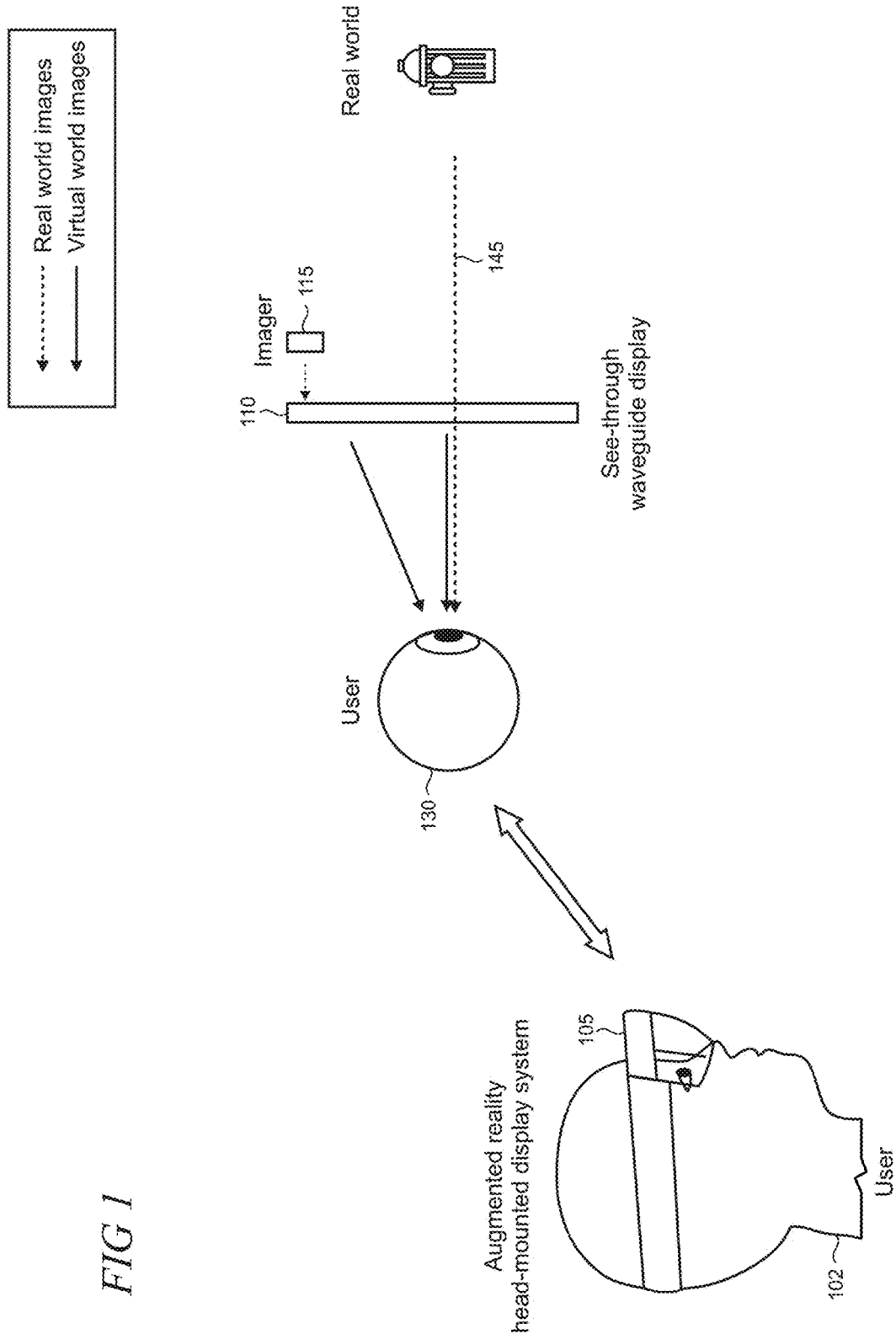
FIG. 1 shows an illustrative augmented reality head-mounted display (HMD) device that incorporates a see-through waveguide and virtual reality imager.

FIG. 1 shows an illustrative augmented reality HMD device 105 that incorporates a see-through waveguide display 110 and a virtual reality imager 115. The imager 115 generates virtual world images that are guided by the waveguide display to an eye 130 of a device user 102. As the imager 115 is relatively small due to packaging and other constraints in the HMD device 105, the waveguide display 110 may include exit-pupil expanding components, as described in more detail below, to expand the exit pupil of the virtual images that are output to the user's eye both horizontally and vertically. The expanded exit pupil typically facilitates a display of virtual-world images to be sufficiently sized to meet the various design requirements such as image resolution, field of view (FOV), and the like of a given optical display system while enabling the imager and associated components to be relatively light and compact. Being see-through, the waveguide display 110 enables the user to perceive light from the real world without obstruction, as representatively indicated by ray 145.

Figure 2:
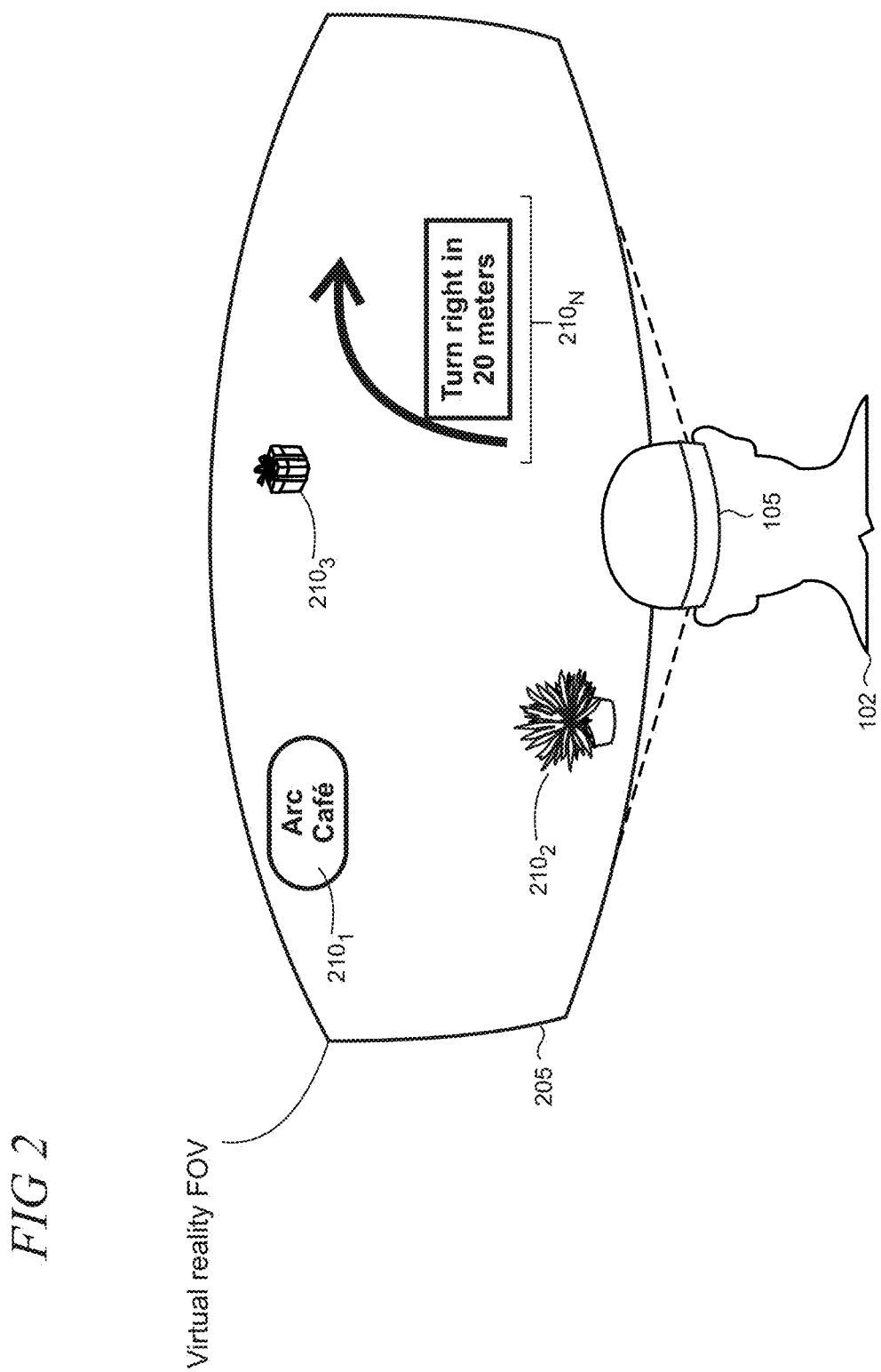
FIG. 2 shows illustrative virtual world objects rendered within a virtual reality FOV of an augmented reality HMD device.
Figure 3:
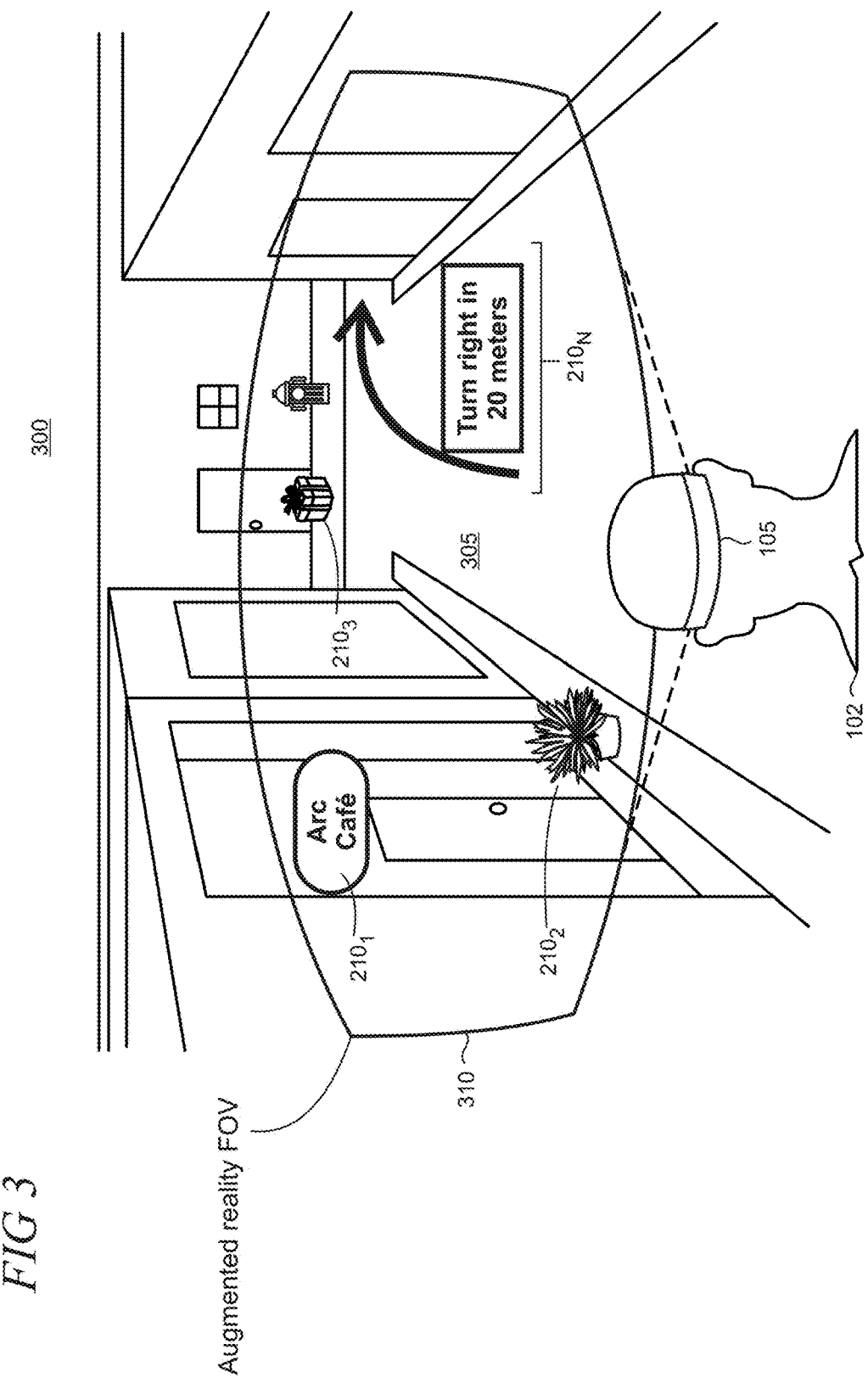
FIG. 3 illustratively shows how virtual world objects are overlaid onto real-world images within the FOV of the augmented reality HMD device.

The waveguide display 110 can show images of various virtual objects $210_{1...N}$, within a virtual reality field of view (FOV) 205 as shown in FIG. 2, and/or an entire virtual world in some cases. As shown in FIG. 3, when the virtual objects 210 are superimposed over the real world 300 viewed through the see-through waveguide display 110, an augmented reality environment 305 is created within the FOV 310. In this illustrative example, the user 102 is physically walking in a real-world urban area that includes city streets with various buildings, stores, etc. The FOV of the cityscape supported on HMD device 105 changes as the user moves through the real-world environment and the device can render virtual images over the real-world view. Here, the virtual images illustratively include a tag that identifies a restaurant business, various virtual objects (a plant and a gift) and directions to a place of interest in the city. The augmented reality environment 305 seen visually on the waveguide display 110 may also be supplemented by audio and/or tactile/haptic sensations produced by the HMD device 105 in some implementations.

While conventional see-through waveguide displays can provide satisfactory features and performance in many applications, they typically produce virtual images in a virtual image plane that appears at a constant distance from the user's eyes. For example, the virtual image plane may have infinity focus. Infinity focus is a state in which an optical system forms a virtual object image at an infinite distance away so that the light rays coming from it are essentially in parallel. However, the virtual world objects in the FOV 310 can be located at any distance. For example, as shown in FIG. 3 the plant $210_2$ outside the restaurant is relatively closer to the user while the package $210_3$ at the end of the street is relatively farther from the user. Thus, a discrepancy can be manifested between a given real-world object and a virtual image in which only one of them is in focus. This focus mismatch can cause image blur and create eye stress, discomfort, and/or cognitive dissonance in some instances.

Figure 4:
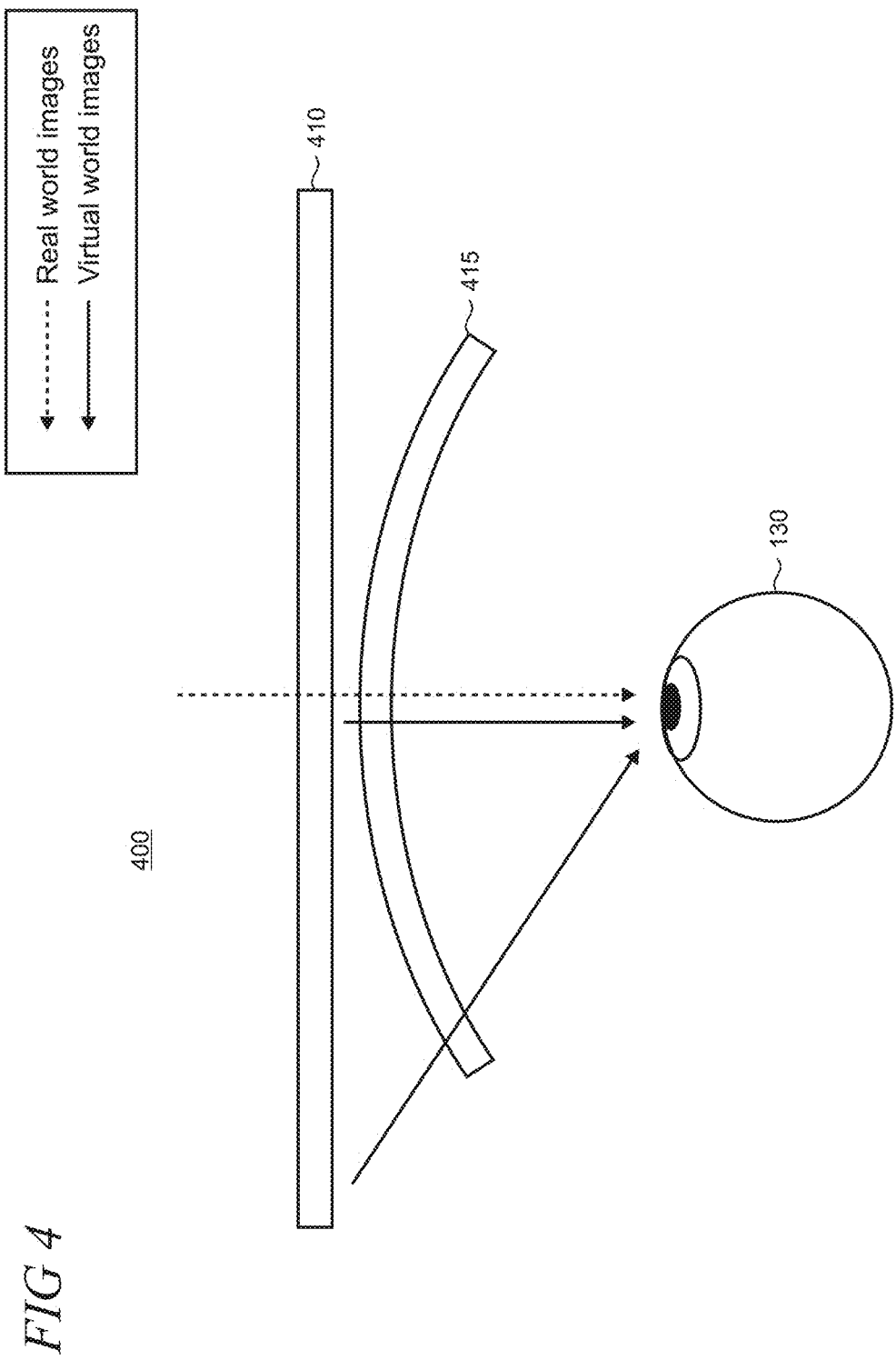
FIG. 4 shows a top view of an illustrative near-eye optical display system including a waveguide display and a curved array of liquid crystal (LC) microlenses.

FIG. 4 shows a top view of an illustrative example of the present near-eye optical waveguide display system 400 with multiple focal depths. By implementing multiple focal depths for virtual images, the focus discrepancy between virtual images and the real world can be reduced or eliminated. The system includes a see-through waveguide display 410 and a curved two-sided microlens array 415 that is located between the waveguide display 410 and the user's eye 130. The waveguide display 410 can include components such as diffractive optical elements (DOEs), described below, to in-couple virtual images from an imager (not shown), expand the exit pupil in two directions, and out-couple the images from the waveguide.

Figure 5:
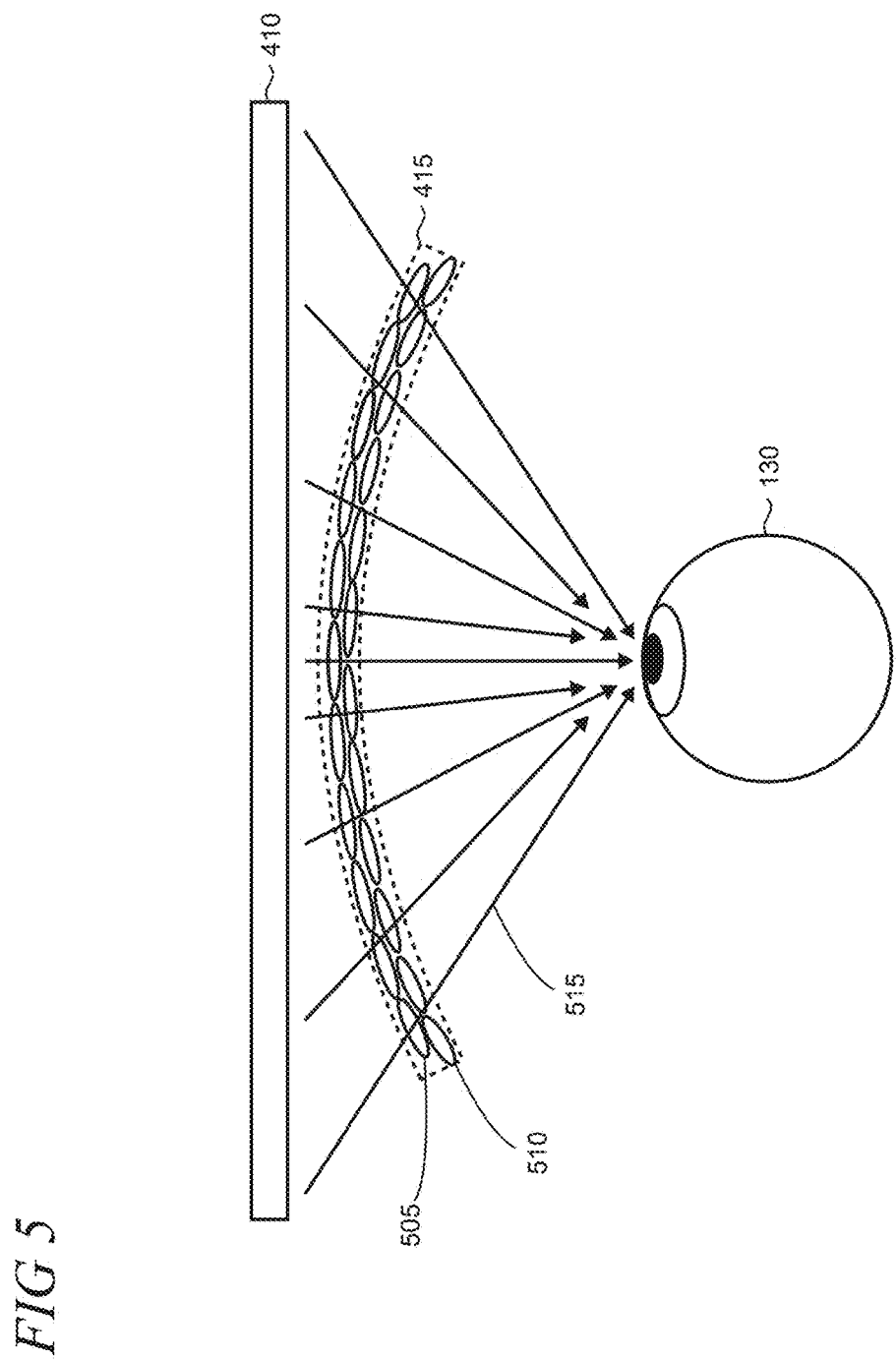
FIG. 5 shows how the curved array is configured as a two-sided array with layers of LC microlenses.

As shown in FIG. 5, the array 415 includes a layer of LC microlenses (representatively indicated by reference numeral 505) on the waveguide side of the curved array and another layer of LC microlenses (representatively indicated by reference numeral 510) on the eye side of the array. The drawing in FIG. 5 is simplified for purposes of illustration and a given microlens configuration can vary from what is depicted. The array 415 employs a curved topology having at least some non-planar portions to help optimize the alignment of the optical axis of each microlens with respect to the user's eye 130. Such optimization may reduce aberrations in the transmitted wavefronts that can degrade image quality. While LC microlenses are utilized in this illustrative example, other types of tunable lenses can be utilized to meet the needs of a particular implementation.

In some implementations, the radius of curvature of the array can be constant (i.e., the array is shaped as a portion of a circular cylinder). In other implementations, the curvature is non-constant (i.e., the array is shaped as a portion of an elliptic cylinder). The proximate central portion of the array directly in front of the eye can be relatively flatter, or planar, compared to the distal portions at the ends of the array. In an alternative implementation, the array can be curved along two axes and be shaped as a section of a sphere or ovoid. In another alternative implementation, the array can be configured as a planar array or an array having at least a planar portion.

Figure 6:
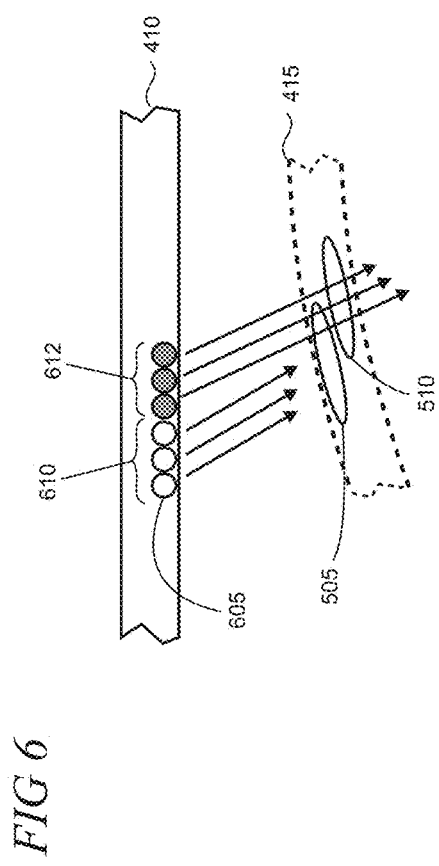
FIG. 6 shows illustrative mapping of pixels from the waveguide to LC microlenses in the two-sided array.

Regions of the waveguide display 410 may be mapped to a particular LC microlens in the array 415, as representatively indicated by ray 515. The size of each mapped region can vary by implementation and range from a single pixel to a group of multiple pixels. The regions can be uniformly sized or vary in size. In this illustrative example, groups of adjacent or spatially proximate pixels can be mapped from the waveguide display to an individual LC microlens. That is, the mapping is performed on a many-to-one basis as illustratively shown in FIG. 6 (a representative pixel is indicated by reference numeral 605). The mapping enables only those particular LC microlenses that are on top of the region of the waveguide display 410 that is displaying a virtual image to be electrically activated. Such selective activation avoids the boundary diffraction between microlenses that would otherwise negatively impact virtual image quality. The selective activation of LC microlenses further enables the virtual images to be placed in various different focal planes without affecting the focus of the real world viewed through the see-through waveguide display 410.

The imager 115 (FIG. 1) and/or associated components in a light engine that incorporates the imager, may be configured to implement raster scanning so that adjacent pixels are scanned sequentially or in some other scanning order (e.g., every second, third, fourth pixel, etc.). Raster scanning may also be applied to groups of proximate pixels where groups of pixels are sequentially scanned or scanned in some other order. LC microlenses in respective layers of the array are switched on and off as appropriate in response to the scanning so that simultaneous activation of overlapping LC microlenses is avoided and the edge effects which would otherwise negatively impact image quality are reduced or eliminated. For example, a group of pixels 610 is mapped to LC microlens 505 and an adjacent group of pixels 612 is mapped to 510 in FIG. 6. The raster scanning order of the pixels in the groups is selected so that LC microlenses 505 and 510 are not simultaneously activated.

Figure 7:
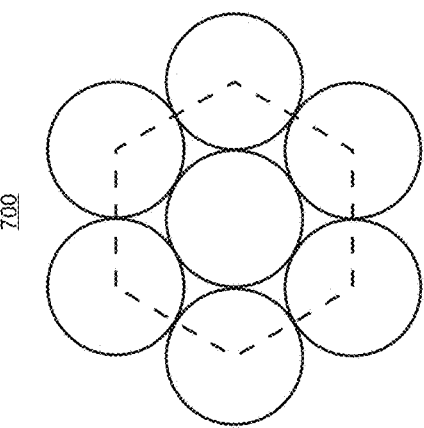
FIGS. 7, 8, and 9 show illustrative hexagonal packaging configurations for the LC microlenses.
Figure 9:
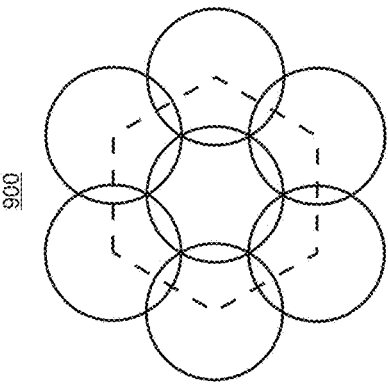
Figure 8:
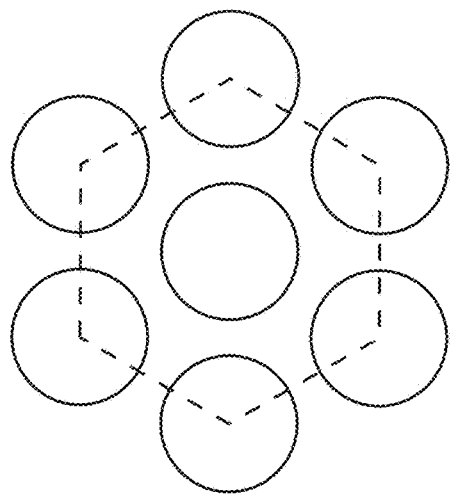

The LC microlenses can be arranged into hexagonal packages. The packaging arrangements can vary by implementation. FIG. 7 shows a first illustrative package 700 of LC microlenses in which a group of seven microlenses are arranged in a hexagon in a closely packed configuration that minimizes the interstitial area between adjacent microlenses. FIG. 8 shows a second illustrative package 800 of LC microlenses in which the microlenses are hexagonally packaged in a non-closely packed configuration. FIG. 9 shows a third illustrative package 900 of LC microlenses in which the microlenses are hexagonally packaged with some overlap so that the interstitial areas are eliminated altogether. The hexagonal packages shown in FIGS. 7, 8, and 9 are illustrative and other packaging configurations may be utilized to meet the needs of a particular implementation of the present waveguide display with multiple focal depths.

A plurality of LC microlens packages can be disposed on each side of the array 415 in some implementations although a single hexagonal package may be used on each side of the array in other implementations. Use of a single or multiple packages is typically a design choice that depends on the size and resolution of the waveguide display, as well as the size of the LC microlenses that are utilized. The LC microlenses can be configured, for example, with a diameter of about 2 to 3 mm (i.e., approximately the size of the user's pupil). Compared with those used in some conventional light field displays, the size of an LC microlens utilized in the array in the present near-eye application is relatively larger and the number of microlenses employed in the array is relatively smaller. However, as noted above, multiple pixels are typically mapped to each LC microlens in the array. This many-to-one mapping of pixels to microlenses enables a relatively small number of large diameter lenses to provide multiple focal depths for virtual images rendered across the full expanse of the waveguide display.

Figure 10:
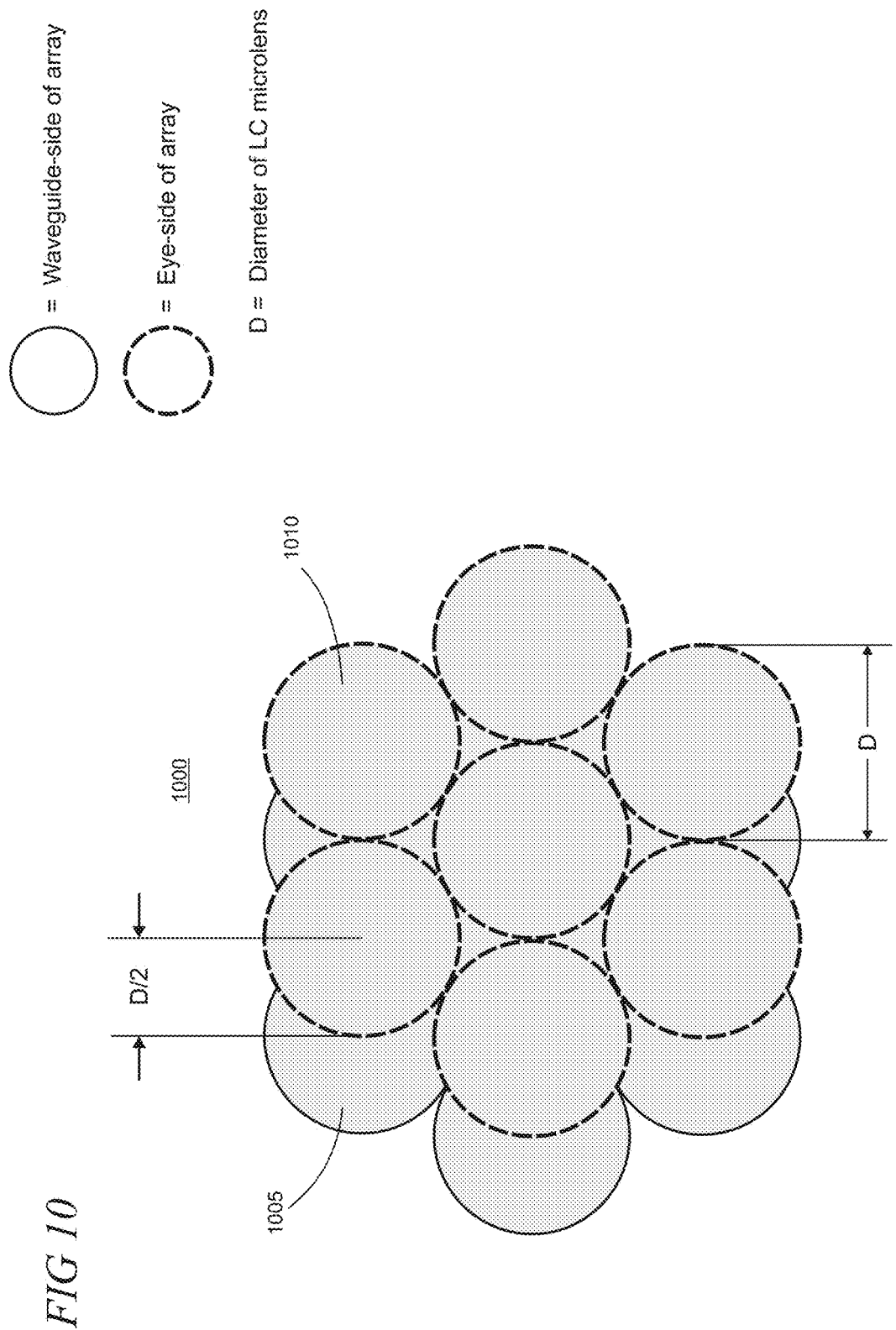
FIG. 10 shows an illustrative spatial offset between hexagonal LC microlens packages.

FIG. 10 shows an illustrative arrangement 1000 of LC microlens hexagonal packages that may be utilized in the two-sided array 415. As shown, the eye-side package 1005 is offset from the waveguide-side package 1010 by about a half of the diameter D of a microlens. The offset provides that the interstitial areas between adjacent LC microlenses in one layer are covered by the microlenses in the other layer. While the microlenses in the layers are offset in the horizontal direction in this particular example, the layers can alternatively be offset in either or both directions by varying amounts depending on the needs of a particular implementation.

Figure 11:
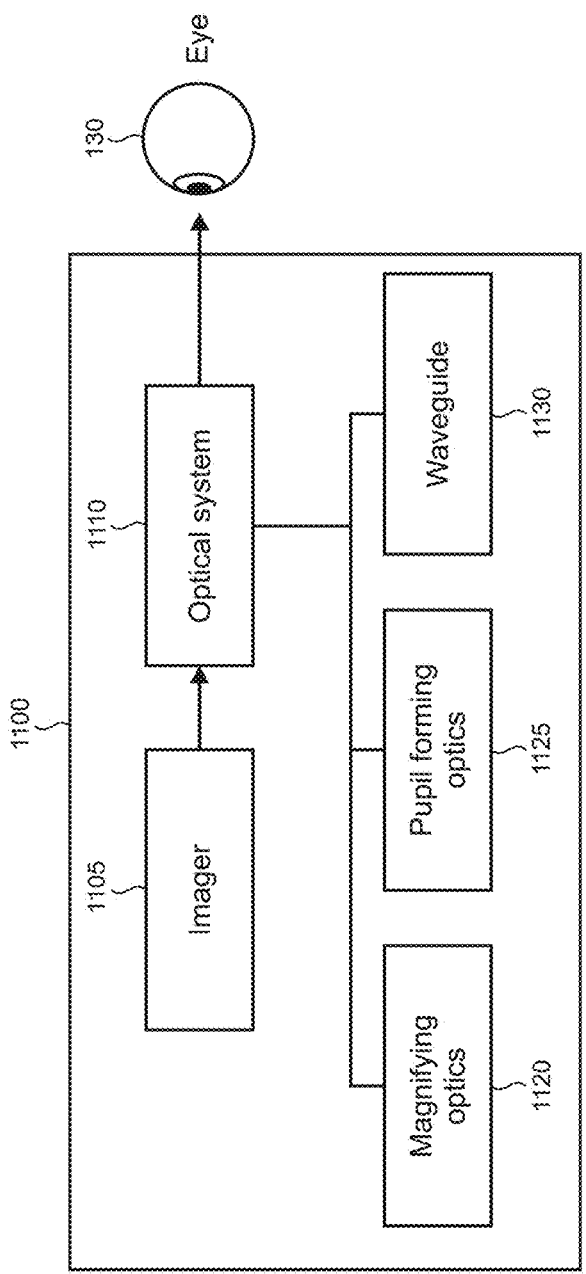
FIG. 11 shows a top view of an illustrative exit pupil expander.

Turning now to various implementation details, FIG. 11 shows a block diagram of an illustrative near-eye optical display system 1100 that may be utilized to provide the waveguide portion of the present waveguide display with multiple focal depths. In an illustrative embodiment, the near-eye optical display system 1100 uses a combination of diffractive optical elements (DOEs) that provide in-coupling of incident light into a waveguide, exit pupil expansion in two directions, and out-coupling of light out of the waveguide. Near-eye display systems are frequently used, for example, in HMD devices in industrial, commercial, and consumer applications. Other electronic devices and systems may also utilize near-eye display systems, as described below.

System 1100 may include an imager 1105 that works with an optical system 1110 to deliver images as a virtual display to a user's eye 130. The imager 1105 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The imager 1105 may also include mirrors and other components that enable a virtual display to be composed and may provide one or more input optical beams to the optical system. The optical system 1110 can typically include magnifying optics 1120, pupil forming optics 1125, and one or more waveguides 1130.

In a near-eye display system, the imager 1105 does not actually shine the images on a surface such as a glass lens to create the visual display for the user. This is not feasible because the human eye cannot focus on something that is that close. Rather than create a visible image on a surface, the near-eye optical display system 1100 uses the pupil forming optics 1125 to form a pupil and the eye 130 acts as the last element in the optical chain and converts the light from the pupil into an image on the eye's retina as a virtual display.

Figure 12:
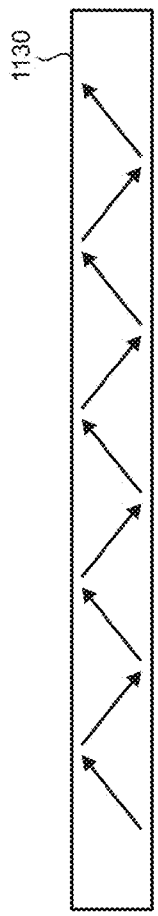
FIG. 12 shows propagation of light in a waveguide by total internal reflection.

The waveguide 1130 facilitates light transmission between the imager 1105 and the eye. One or more waveguides can be utilized in the near-eye display system 1100 because they are transparent and because they are generally small and lightweight (which is desirable in applications such as HMD devices where size and weight is generally sought to be minimized for reasons of performance and user comfort). For example, the waveguide 1130 can enable the imager 1105 to be located out of the way, for example, on the side of the head, leaving only a relatively small, light, and transparent waveguide optical element in front of the eyes. In one implementation, the waveguide 1130 operates using a principle of total internal reflection, as shown in FIG. 12, so that light can be coupled among the various optical elements in the system 1100.

Figure 13:
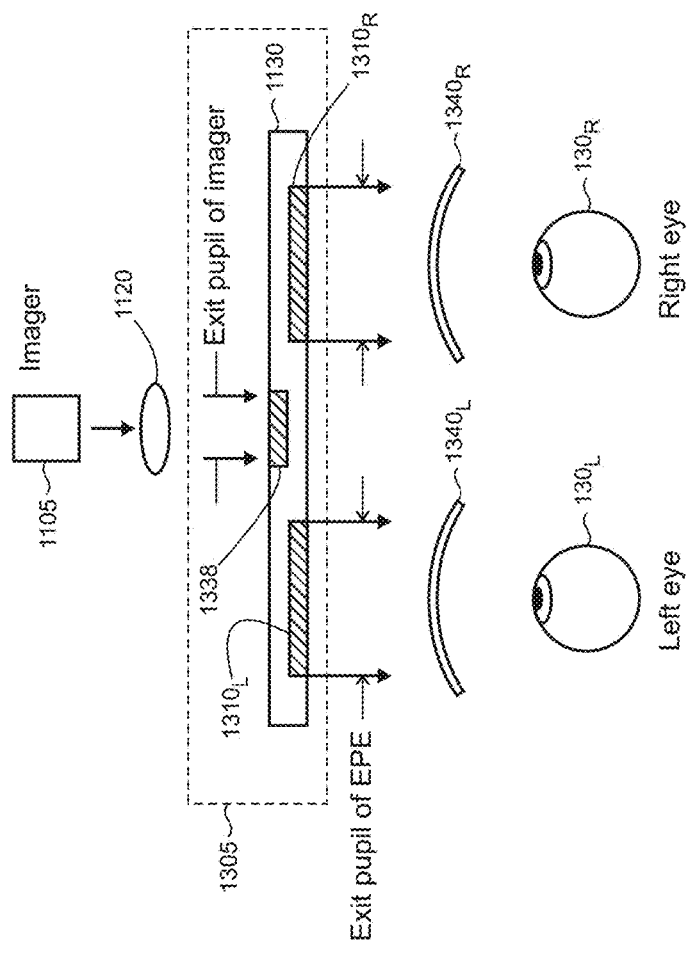
FIG. 13 shows a top view of an illustrative exit pupil expander.

FIG. 13 shows a view of an illustrative exit pupil expander (EPE) 1305. EPE 1305 receives an input optical beam from the imager 1105 through magnifying optics 1120 to produce one or more output optical beams with expanded exit pupil in one or two directions relative to the exit pupil of the imager (in general, the input may include more than one optical beam which may be produced by separate sources). The expanded exit pupil typically facilitates a virtual display to be sufficiently sized to meet the various design requirements of a given optical system, such as image resolution, field of view, and the like, while enabling the imager and associated components to be relatively light and compact.

The EPE 1305 is configured, in this illustrative example, to support binocular operation for both the left and right eyes. Components that may be utilized for stereoscopic operation such as scanning mirrors, lenses, filters, beam splitters, MEMS devices, or the like are not shown in FIG. 13 for sake of clarity in exposition. The EPE 1305 utilizes two out-coupling gratings, 1310$_L$ and 1310$_R$ that are supported on the waveguide 1130 along with a central in-coupling grating 1338. In some implementations, separate in-coupling gratings may be utilized. The out-coupling gratings provide virtual images that can be focused with multiple depths using respective curved arrays of LC microlenses, as indicated by reference numerals 1340$_L$ and 1340$_R$.

The in-coupling and out-coupling gratings may be configured using multiple DOEs, as described in the illustrative example described below and shown in FIG. 15. While the EPE 1305 is depicted as having a planar configuration, other shapes may also be utilized including, for example, curved or partially spherical shapes, in which case the gratings disposed thereon are non-co-planar.

Figure 14:
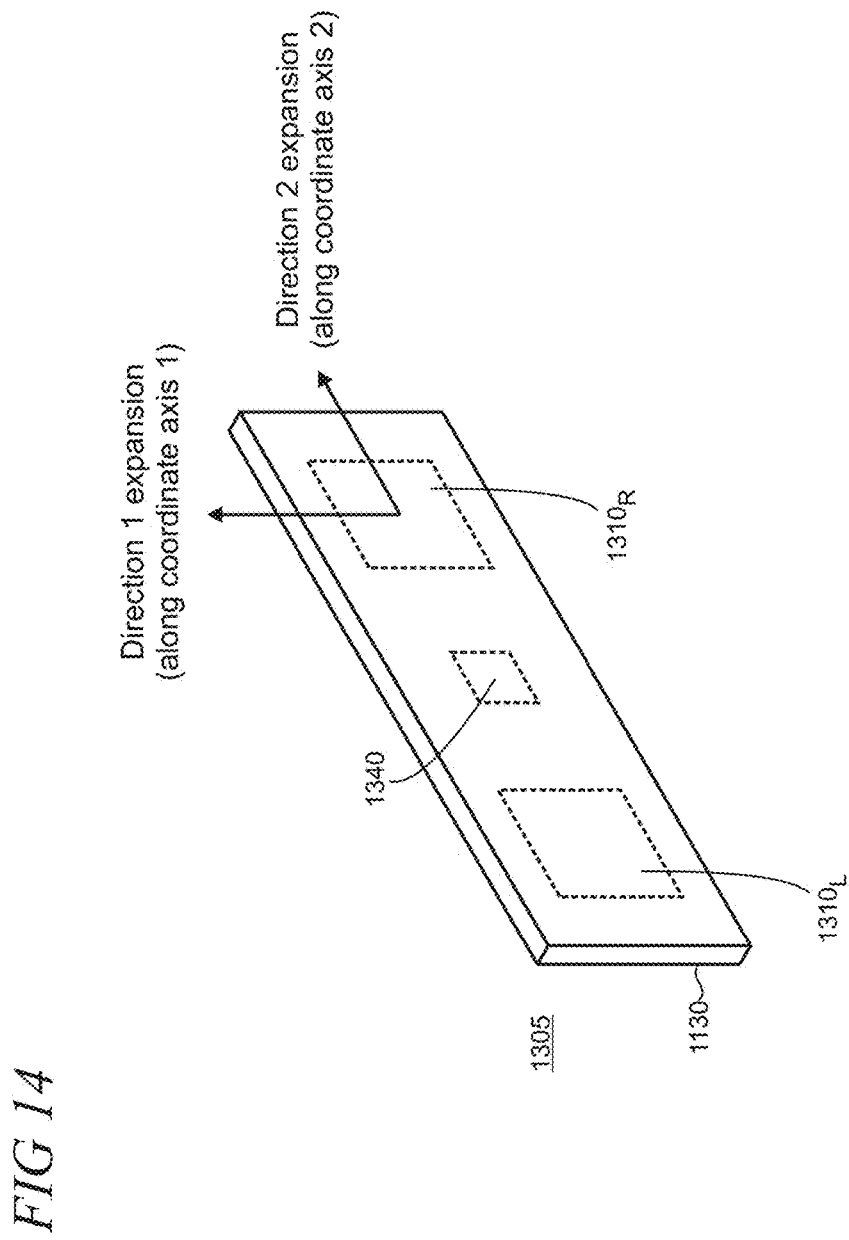
FIG. 14 shows a view of an illustrative exit pupil expander in which the exit pupil is expanded along two directions.

As shown in FIG. 14, the EPE 1305 may be configured to provide an expanded exit pupil in two directions (i.e., along each of a first and second coordinate axis). As shown, the exit pupil is expanded in both the vertical and horizontal directions. It may be understood that the terms "direction," "horizontal," and "vertical" are used primarily to establish relative orientations in the illustrative examples shown and described herein for ease of description. These terms may be intuitive for a usage scenario in which the user of the near-eye display device is upright and forward facing, but less intuitive for other usage scenarios. The listed terms are not to be construed to limit the scope of the configurations (and usage scenarios therein) of the present waveguide display system with multiple focal depths.

Figure 15:
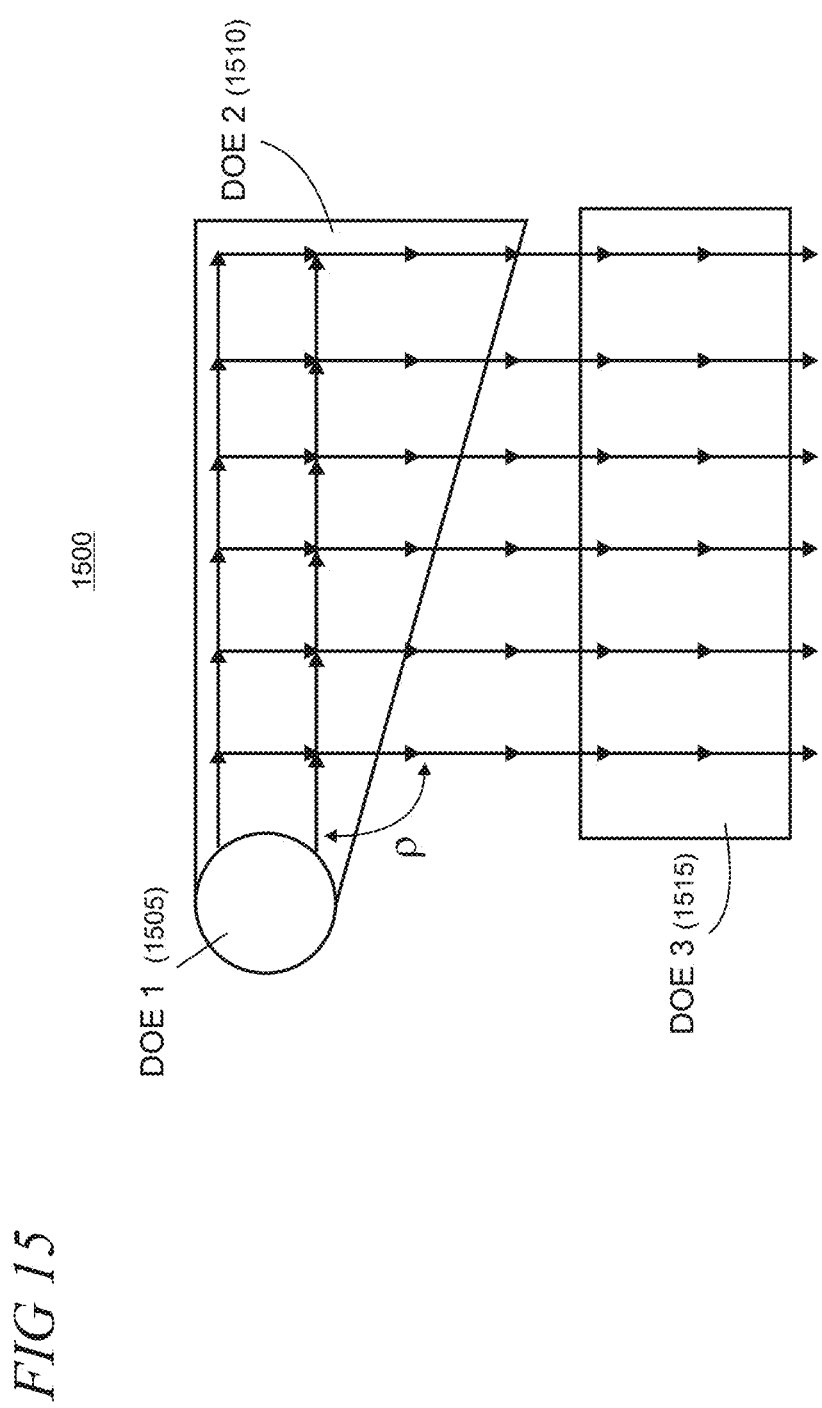
FIG. 15 shows an illustrative arrangement of three diffractive optical elements (DOEs) configured for in-coupling virtual images from an imager, exit pupil expansion, and out-coupling.

FIG. 15 shows an illustrative arrangement 1500 of three DOEs that may be used with, or as a part of, a diffractive waveguide to provide in-coupling, expansion of the exit pupil in two directions, and out-coupling in an EPE in which the out-coupling DOE provides virtual images that can be displayed at multiple focal depths using the array of LC microlenses. In this particular illustrative example, DOEs are utilized for in-coupling and out-coupling, however in other implementations either or both the in-coupling and out-coupling may be performed using one or more of dichroic mirrors, coatings, or prism structures that operate in refraction or reflection.

Each DOE is an optical element comprising a periodic structure that can modulate various properties of light in a periodic pattern such as the direction of optical axis, optical path length, and the like. The first DOE, DOE 1 (indicated by reference numeral 1505), is configured to couple an imaging beam from an imager into the waveguide. The second DOE, DOE 2 (1510), expands the exit pupil in a first direction along a first coordinate axis, and the third DOE, DOE 3 (1515), expands the exit pupil in a second direction along a second coordinate axis and couples light out of the waveguide. The angle ρ is a rotation angle between the periodic lines of DOE 2 and DOE 3, as shown (it is noted that the various directions of propagation in FIG. 15 are depicted in an arbitrary manner and that the directions are not necessarily orthogonal).

DOE 1 thus functions as an in-coupling grating and DOE 3 functions as an out-coupling grating while expanding the pupil in one direction. DOE 2 may be considered as an intermediate grating that functions to couple light between the in-coupling and out-coupling gratings while performing exit pupil expansion in another direction. Using such intermediate grating may eliminate a need for conventional functionalities for exit pupil expansion in an EPE such as collimating lenses.

Figure 16:
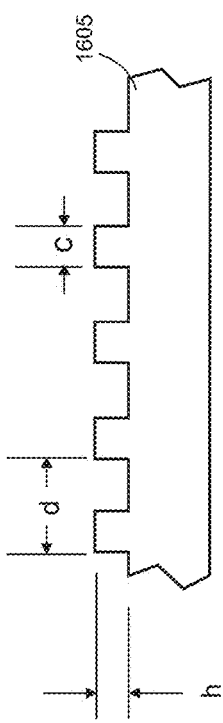
FIG. 16 shows a profile of a portion of an illustrative diffraction grating that has straight gratings.
Figure 17:
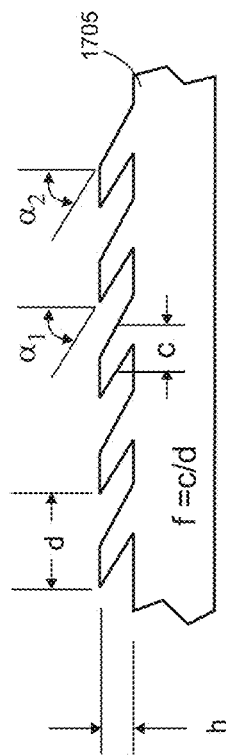
FIG. 17 shows a profile of a portion of an illustrative diffraction grating that has asymmetric or slanted gratings.

As shown in FIGS. 16 and 17, respectively, the DOEs 1505, 1510, and 1515 can be configured using straight (i.e., non-slanted) grating features 1600 (typically referred to as grating bars or simply "gratings"), that are formed in a substrate 1605 or using slanted grating features 1700 formed in a substrate 1705. Asymmetric grating profiles can also be implemented using blazed gratings, or echelette gratings, in which grooves are formed to create grating features with asymmetric triangular or sawtooth profiles. In FIGS. 16 and 17, the grating period is represented by d, the grating height by h (also referred to as grating "depth"), bar width by c, and the fill factor by f, where f=c/d. The slanted gratings in FIG. 17 may be described by slant angles $\alpha_1$ and $\alpha_2$.

Figure 18:
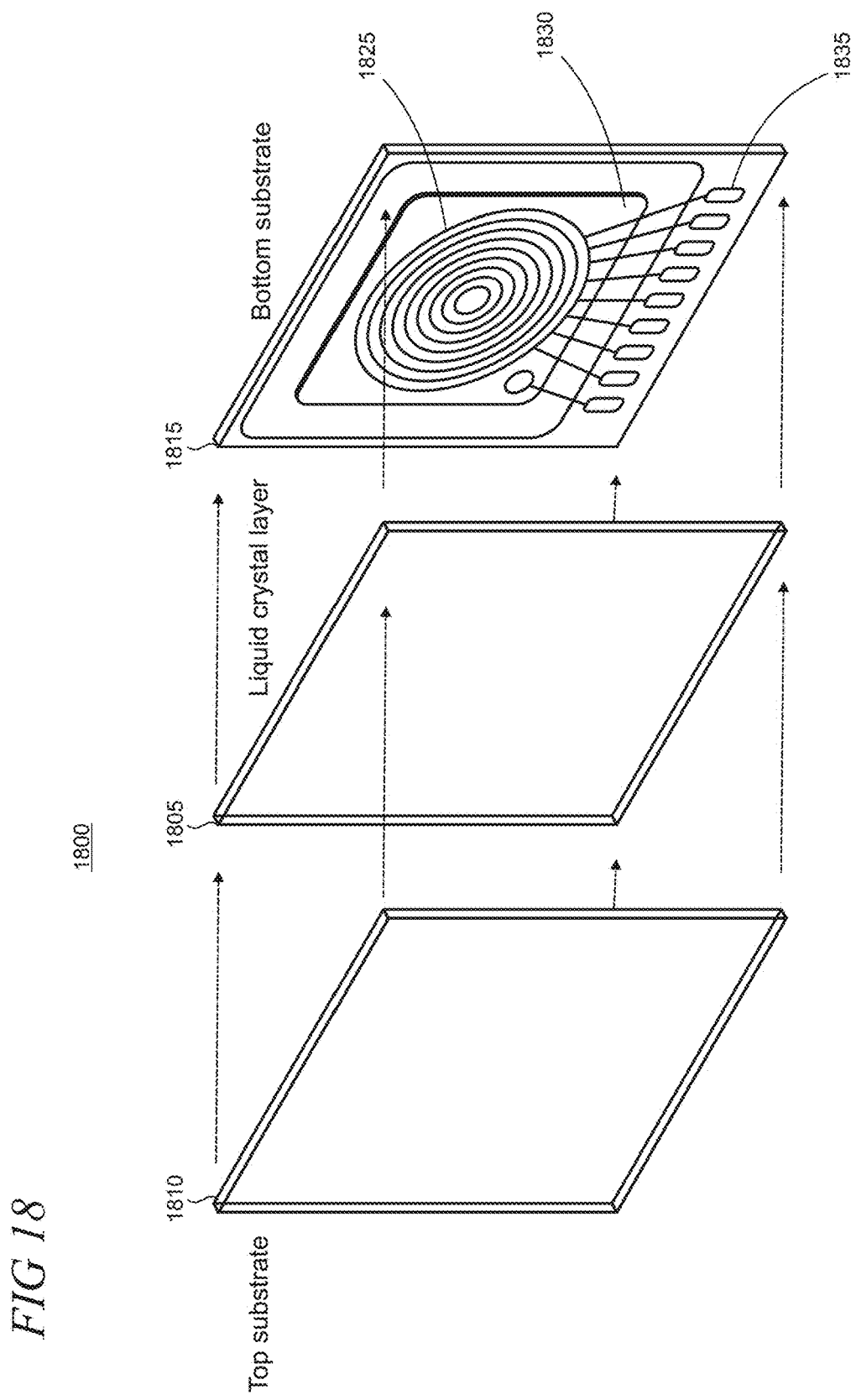
FIG. 18 shows an exploded view of an illustrative tunable LC microlens.

FIG. 18 shows an exploded view of an illustrative electrically-modulated tunable LC microlens 1800 that may be utilized in the array 415 (FIG. 4). The LC microlens 1800 comprises a layer 1805 of LC material that sits between a top substrate 1810 and a bottom substrate 1815 (it is noted that the terms top and bottom are used for reference purposes and the microlens 1800 can be used in a variety of orientations depending on the needs of a given application). The top and bottom substrates can be made from polymer and/or glass depending on implementation and may further be configured as lenses and/or have other optical characteristics or functions (e.g., filtering, absorbing, polarizing, diffracting, waveguiding, or the like) in some cases.

The assembled microlens is typically configured as a compact package, for example having a few millimeters of thickness depending on application, and can be implemented as a discrete component. As noted above in the text accompanying FIG. 5, layers of LC microlenses may be located on either side of the two-sided array. The LC microlenses may also be incorporated into a diffractive waveguide, lens system, or other suitable portion or component of an optical display system.

The LC layer 1805 includes floating electrodes (not shown) that interoperate with concentric ring electrodes 1825 that are located in a bond layer 1830 proximate to the bottom substrate 1815. When an electric profile from an array controller (described below in the text accompanying FIG. 22) is applied through edge conductors (representatively indicated by reference numeral 1835) to a particular region of the LC layer, the floating electrodes slide into place to fill gaps between the concentric electrodes. The floating electrodes enable increased optical performance of the tunable microlens by reducing light scattering that could otherwise occur in the gaps between the concentric electrodes. Phase sampling across the lens plane is also increased through utilization of the floating electrodes which may further improve lens performance. Charge state in the LC layer is also readily maintained which makes the tunable LC microlens highly energy efficient to preserve power which is typically limited in battery-powered systems such as HMD devices.

By controlling the electric profile applied to various portions of the LC layer 1805, the optical wavefront of the LC microlens is analog adjustable which enables infinitely-variable focus at any desired power, ranging between the maximum plus and maximum minus optical power of the lens. In addition, the wavefront shape can be controlled with fine-granularity by applying energy to specific regions of the microlens. Such fine-grain control can be utilized to control the optics in a given display system to implement virtual images with multiple focal depths to support various features and user experiences, and also correct for aberrations, distortion, refractive errors and the like as well. Typically, an LC microlens is configured as a plano lens (i.e., having no effect on image focus) when it is not activated using the electric profile. However, in some implementations, the LC microlens may be activated to control the optical wavefront to compensate for optical properties of upstream or downstream components that may be utilized in the optical display system.

Figure 19:
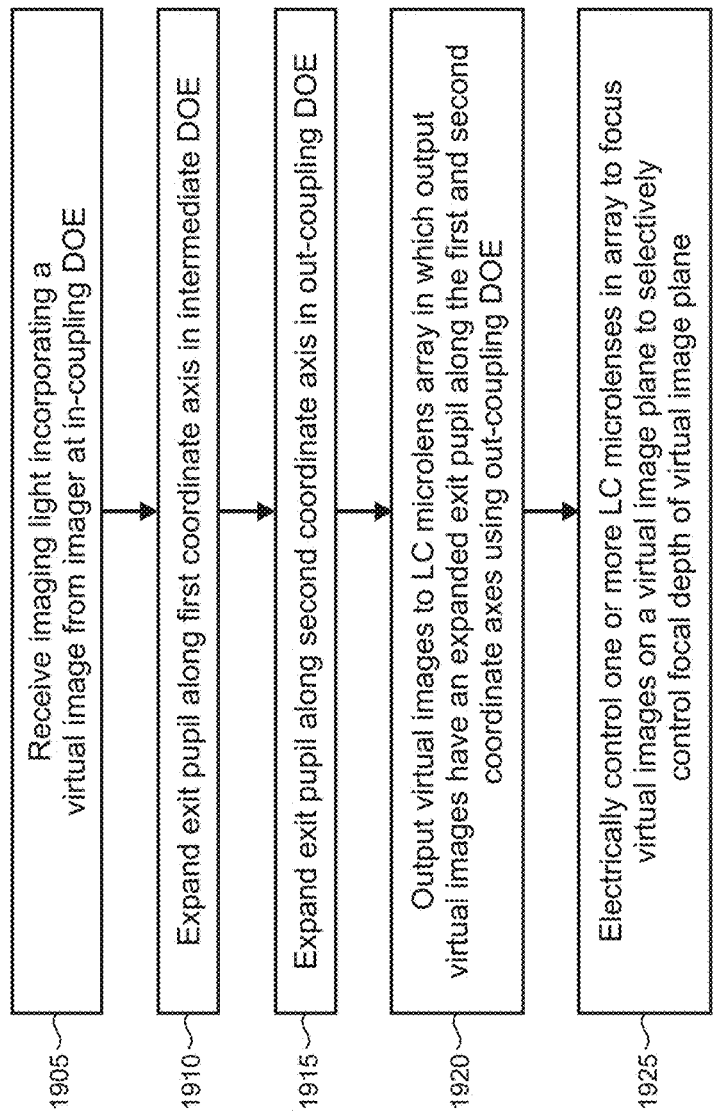
FIG. 19 shows an illustrative method.

FIG. 19 is a flowchart of an illustrative method 1900 that may be used when implementing a waveguide display with multiple focal depths. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1905, light incorporating virtual images from an imager is received at an in-coupling DOE disposed in an EPE of a waveguide display. The in-coupling DOE interfaces with a downstream intermediate DOE that is disposed in the EPE. The intermediate DOE is configured to interface with a downstream out-coupling DOE.

In step 1910, the exit pupil of the received light is expanded along a first coordinate axis in the intermediate DOE. In step 1915, the exit pupil is expanded along a second coordinate axis in an out-coupling DOE. In step 1920, the out-coupling DOE diffracts light out as an output from the EPE to the LC microlens array with an expanded exit pupil relative to the received light at the in-coupling DOE along the first and second coordinate axes.

In step 1925, the tunable LC microlens may be electrically controlled to focus the out-coupled virtual images onto a virtual image plane. The electrical control can be varied to impart multiple focal depths so that the virtual image plane can be located at different focal depths. As described in more detail in the text accompanying FIGS. 21 and 22, operation of the LC microlens array does not impact the focus of real-world images as only the individual LC microlens which are mapped to pixels for virtual images are activated based on detection of the user's gaze direction. The other LC microlenses in the array are not activated (or are otherwise configured to be plano without focus changing) and therefore do not impart any focus changes on the real-world image that the user sees when looking through the waveguide display.

Multiple focal depths may be incorporated into a display system that is utilized in a virtual or augmented reality display device. Such device may take any suitable form, including but not limited to near-eye devices such as an HMD device. A see-through display may be used in some implementations while an opaque (i.e., non-see-through) display using a camera-based pass-through or outward facing sensor, for example, may be used in other implementations.

Figure 20:
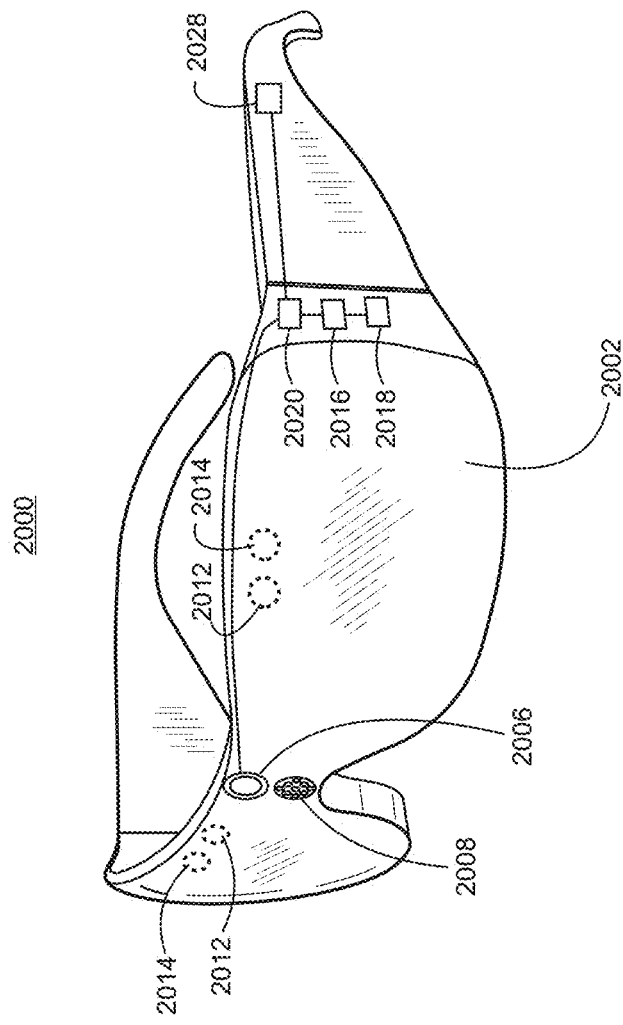
FIG. 20 is a pictorial view of an illustrative example of a virtual reality or augmented reality HMD device.
Figure 21:
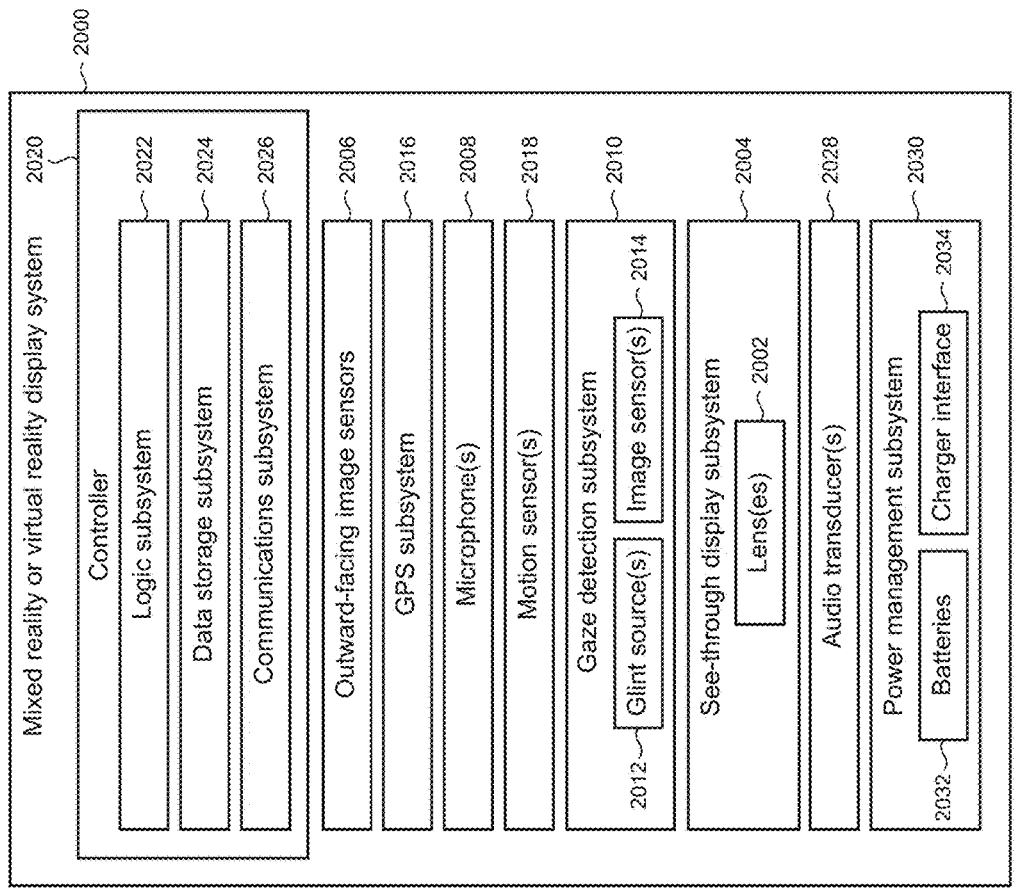
FIG. 21 shows a block diagram of an illustrative example of a virtual reality or augmented reality HMD device.

FIG. 20 shows one particular illustrative example of a see-through, augmented reality or virtual reality display system 2000, and FIG. 21 shows a functional block diagram of the system 2000. Display system 2000 comprises one or more lenses 2002 that form a part of a see-through display subsystem 2004, such that images generated from an imager (not shown) may be displayed using lenses 2002 (e.g. using projection onto lenses 2002, one or more waveguide systems incorporated into the lenses 2002, and/or in any other suitable manner). The see-through display subsystem 2004 can include one or more see-through waveguides with an EPE and one or more LC microlens arrays, as described above.

Display system 2000 further comprises one or more outward-facing image sensors 2006 configured to acquire images of a background scene and/or physical environment being viewed by a user, and may include one or more microphones 2008 configured to detect sounds, such as voice commands from a user. Outward-facing image sensors 2006 may include one or more depth sensors and/or one or more two-dimensional image sensors. In alternative arrangements, as noted above, an augmented reality or virtual reality display system, instead of incorporating a see-through display subsystem, may display augmented reality or virtual reality images through a viewfinder mode for an outward-facing image sensor.

The display system 2000 may further include a gaze detection subsystem 2010 configured for detecting a direction of gaze of each eye of a user or a direction or location of focus, as described above. The gaze detection subsystem 2010 may have any suitable number and arrangement of light sources and image sensors. Gaze detection subsystem 2010 may be configured to determine gaze directions of each of a user's eyes in any suitable manner. For example, in the illustrative example shown, a gaze detection subsystem 2010 includes one or more glint sources 2012, such as infrared light sources, that are configured to cause a glint of light to reflect from each eyeball of a user, and one or more image sensors 2014, such as inward-facing sensors, that are configured to capture an image of each eyeball of the user.

Changes in the glints from the user's eyeballs and/or a location of a user's pupil, as determined from image data gathered using the image sensor(s) 2014, may be used to determine a direction of gaze. In addition, a location at which gaze lines projected from the user's eyes intersect the waveguide display may be used to determine an object at which the user is gazing (e.g. a displayed virtual-world object and/or real background object). As noted above, individual LC microlenses in the array 415 (FIG. 5) are mapped to a respective specific pixel or groups of pixels in the waveguide. By detecting the area of the waveguide display upon which the user is gazing, only the LC microlenses in the array that are mapped to that area are activated. This selective activation ensures that the real-world images that the user sees through the waveguide are not changed by the LC microlens array (i.e., focus of the real-world images is not impacted).

The display system 2000 may also include additional sensors. For example, display system 2000 may comprise a global positioning system (GPS) subsystem 2016 to allow a location of the display system 2000 to be determined. This may help to identify real-world objects, such as buildings, etc. that may be located in the user's adjoining physical environment.

The display system 2000 may further include one or more motion sensors 2018 (e.g., inertial, multi-axis gyroscopic, or acceleration sensors) to detect movement and position/orientation/pose of a user's head when the user is wearing the system as part of an augmented reality or virtual reality HMD device. Motion data may be used, potentially along with eye-tracking glint data and outward-facing image data, for gaze detection, as well as for image stabilization to help correct for blur in images from the outward-facing image sensor(s) 2006. The use of motion data may allow changes in gaze location to be tracked even if image data from outward-facing image sensor(s) 2006 cannot be resolved.

In addition, motion sensors 2018, as well as microphone(s) 2008 and gaze detection subsystem 2010, also may be employed as user input devices, such that a user may interact with the display system 2000 via gestures of the eye, neck and/or head, as well as via verbal commands in some cases. It may be understood that sensors illustrated in FIGS. 20 and 21 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 2000 can further include a controller 2020 having a logic subsystem 2022 (which may include one or more processors) and a data storage subsystem 2024 in communication with the sensors, gaze detection subsystem 2010, display subsystem 2004, and/or other components through a communications subsystem 2026. The communications subsystem 2026 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2024 may include instructions stored thereon that are executable by logic subsystem 2022, for example, to receive and interpret inputs from the sensors, to identify location and movements of a user, to identify real objects using surface reconstruction and other techniques, and dim/fade the display based on distance to objects so as to enable the objects to be seen by the user, among other tasks. The storage subsystem 2024 and logic subsystem 2022 can be configured to control the selective activation of LC microlenses in the array based on gaze direction, as described above. The storage subsystem 2024 and logic subsystem 2022 can also be configured to control the imager in the see-through display subsystem 2004 to implement the raster scanning described above in the text accompanying FIG. 6.

The display system 2000 is configured with one or more audio transducers 2028 (e.g., speakers, earphones, etc.) so that audio can be utilized as part of an augmented reality or virtual reality experience. A power management subsystem 2030 may include one or more batteries 2032 and/or protection circuit modules (PCMs) and an associated charger interface 2034 and/or remote power interface for supplying power to components in the display system 2000.

It may be appreciated that the display system 2000 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 22:
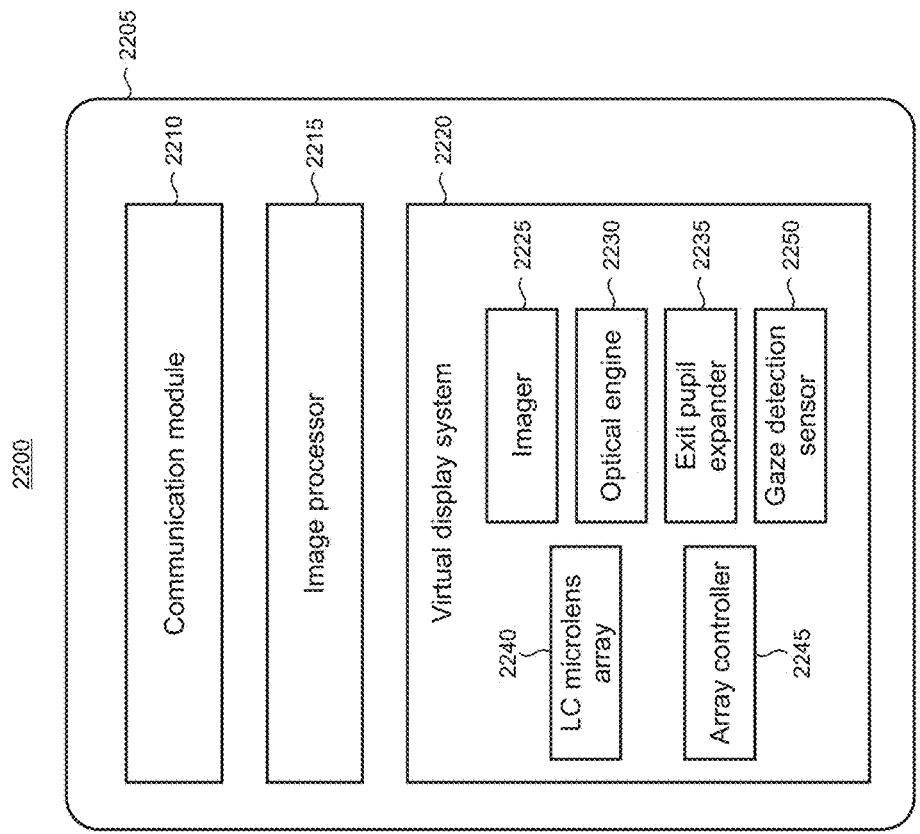
FIG. 22 shows a block diagram of an illustrative electronic device that incorporates an augmented reality display system with multiple focal depths.

As shown in FIG. 22, a waveguide display system with multiple focal depths can be used in a mobile or portable electronic device 2200, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 2200 includes a housing 2205 to house a communication module 2210 for receiving and transmitting information from and to an external device, or a remote system or service (not shown).

The portable device 2200 may also include a virtual image processor 2215 for handling the received and transmitted information, and a virtual display system 2220 to support viewing of images. The virtual display system 2220 can include a micro-display or an imager 2225 and an optical engine 2230. The virtual image processor 2215 may be operatively connected to the optical engine 2230 to provide image data, such as video data, to the imager 2225 to display an image thereon. An EPE 2235 can be optically linked to the optical engine 2230. The EPE may include a see-through waveguide display which may incorporate or be part of a display system that supports multiple focal depths for virtual images. An LC microlens array 2240 may also be included in the virtual display system 2220. An array controller 2245 is configured to selectively activate one or more LC microlenses in the array to impart multiple focal depths to virtual images based on a portion of the waveguide display upon which the user is gazing. A gaze detection sensor 2250 may be configured to detect the user's direction of gaze in a similar manner to that described above in the text accompanying FIGS. 20 and 21.

A waveguide display system with multiple focal depths may also be utilized in non-portable devices, such as gaming devices, multimedia consoles, personal computers, vending machines, smart appliances, Internet-connected devices, and home appliances, such as an oven, microwave oven and other appliances, and other non-portable devices.

Various exemplary embodiments of the present waveguide display with multiple focal depths are now presented by way of illustration and not as an exhaustive list of all embodiments. An example includes a near-eye optical display system configured to enable a user to view a mixed-reality environment comprising real-world images and virtual images, comprising: an imager configured to generate virtual images; a waveguide configured to enable the user to see through the waveguide to view virtual-world images and including an in-coupling element for in-coupling virtual images into the waveguide, and an out-coupling element for out-coupling virtual images from the see-through waveguide; and an array of lenses, the array configured to impart variable focal depth to virtual images out-coupled from the waveguide to the user's eye and further configured to pass real-world images to the user's eye without imparting change in focal depth.

In another example, the see-through waveguide further includes: a first diffractive optical element (DOE) having an input surface and configured as an in-coupling grating to receive imaging light incorporating the virtual images from the imager; a second DOE configured for pupil expansion of the imaging light along a first direction; and a third DOE having an output surface and configured for pupil expansion of the imaging light along a second direction, and further configured as an out-coupling element to out-couple, as an output to the array of lenses from the output surface, imaging light with expanded pupil relative to the input. In another example, at least a portion of the array is curved with concavity towards the user's eye. In another example, the array is a two-sided array and the lenses are liquid crystal (LC) microlenses which are disposed on each side of the two-sided array. In another example, the lenses in the array are each configured to be tunable by application of an electrical modulation signal.

A further example includes an electronic device supporting an augmented reality experience including virtual images and real-world images for a user, comprising: a virtual image processor configured to provide virtual image data; an optical engine configured to produce virtual images from the virtual image data; an exit pupil expander, responsive to one or more input optical beams incorporating the virtual images, comprising a structure on which multiple diffractive optical elements (DOEs) are disposed including an out-coupling DOE; and a curved array of electrically-modulated tunable lenses, each lens configured to assume a particular wavefront shape to thereby impart multiple focal depths to the virtual images, wherein the array is located on the electronic device between an eye of the user and the out-coupling DOE when the user operates the electronic device, and wherein the exit pupil expander is configured to provide one or more out-coupled optical beams at the out-coupling DOE to the array with an expanded exit pupil relative to the one or more input optical beams.

In another example, the exit pupil expander provides pupil expansion in two directions. In another example, the optical engine includes an imager selected from one of light emitting diode, liquid crystal on silicon device, organic light emitting diode array, or micro-electro mechanical system device. In another example, the imager is configured to operate using raster scanning. In another example, one or more of the lenses include liquid crystal (LC) microlenses comprising floating electrodes and concentric electrodes wherein the floating electrodes are configured to fill gaps between the concentric electrodes when the one or more LC microlenses are electrically modulated. In another example, a given LC microlens in the array is mapped to one or more pixels in the out-coupling DOE based on a position of the one or more pixels in the out-coupling DOE. In another example, the electronic device further includes an array controller to set a focal depth for virtual images by controlling wavefront shape for one or more LC microlenses in the array that are mapped to pixels forming the virtual image. In another example, the electronic device further includes a gaze direction sensor configured to detect a gaze direction of the user, and controlling wavefront shape for one or more LC microlenses in the array that are along a detected gaze direction. In another example, the LC microlens includes a layer of LC material located between respective top and bottom substrates and further comprising a controller configured to electrically modulate the LC microlens to assume the particular wavefront shape to thereby impart focus to the out-coupled optical beams, the controller being adapted to apply an electric profile to various portions of the LC material layer through electrical contacts to the concentric electrodes. In another example, one or more lens is configured to be infinitely variable between a range of optical powers.

A further example includes a method for selectively providing variable focus to virtual images in an augmented reality display system that supports virtual images and real-world images, comprising: receiving, from an imager, imaging light incorporating a virtual image at an in-coupling diffractive optical element (DOE) disposed in an exit pupil expander; expanding an exit pupil of the received imaging light along a first coordinate axis in an intermediate DOE disposed in the exit pupil expander; expanding the exit pupil along a second coordinate axis in an out-coupling DOE disposed in the exit pupil expander; outputting the virtual images using the out-coupling DOE to an array of tunable liquid crystal (LC) microlenses, the output virtual images having an expanded exit pupil relative to the received light at the in-coupling DOE along the first and second coordinate axes; and electrically controlling one or more LC microlenses in the array to focus the virtual image on a virtual image plane, a location of the virtual image plane being at a selectively variable distance from the system based on the electrical control.

In another example, the method further includes mapping pixels from the out-coupling DOE to LC microlenses in the array on a one-to-one basis or a many-to-one basis and controlling the one or more LC microlenses in the array to set focus of the virtual image based on the pixel mapping. In another example, the method further includes detecting a gaze direction of a system user and controlling LC microlenses to set focus of pixels of virtual images that intersect the detected gaze direction. In another example, the electrically controlling comprises analog adjustability of LC material in the LC microlens between various wavefront shapes by application of power to an arrangement of electrodes in an LC microlens. In another example, the method is performed in a near-eye display system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A near-eye optical display system configured to enable a user to view a mixed-reality environment comprising real-world images and virtual images, comprising:
    an imager configured to generate virtual images;
    a waveguide configured to enable the user to see through the waveguide to view virtual-world images and including an in-coupling element for in-coupling virtual images into the waveguide, and an out-coupling element for out-coupling virtual images from the see-through waveguide;
    an array of lenses, the array configured to impart variable focal depth to virtual images out-coupled from the waveguide to the user's eye and further configured to pass real-world images to the user's eye without imparting change in focal depth;
    a first diffractive optical element (DOE) having an input surface and configured as an in-coupling grating to receive imaging light incorporating the virtual images from the imager as an input;
    a second DOE configured for pupil expansion of the imaging light along a first direction; and
    a third DOE having an output surface and configured for pupil expansion of the imaging light along a second direction, and further configured as an out-coupling element to out-couple, as an output to the array of lenses from the output surface, imaging light with expanded pupil relative to the input.

2. The near-eye optical display system of claim 1 in which at least a portion of the array is curved with concavity towards the user's eye.

3. The near-eye optical display system of claim 1 in which the array is a two-sided array and the lenses are liquid crystal (LC) microlenses which are disposed on each side of the two-sided array.

4. The near-eye optical display system of claim 1 in which the lenses in the array are each configured to be tunable by application of an electrical modulation signal.

5. An electronic device supporting an augmented reality experience including virtual images and real-world images for a user, comprising:
    a virtual image processor configured to provide virtual image data;
    an optical engine configured to produce virtual images from the virtual image data;
    an exit pupil expander, responsive to one or more input optical beams incorporating the virtual images, comprising a structure on which multiple diffractive optical elements (DOEs) are disposed including an out-coupling DOE; and a curved array of electrically-modulated tunable lenses, each lens configured to assume a particular wavefront shape to thereby impart multiple focal depths to the virtual images, wherein the array is located on the electronic device between an eye of the user and the out-coupling DOE when the user operates the electronic device, and wherein the exit pupil expander is configured to provide one or more out-coupled optical beams at the out-coupling DOE to the array with an expanded exit pupil relative to the one or more input optical beams.

6. The electronic device of claim 5 in which the exit pupil expander provides pupil expansion in two directions.

7. The electronic device of claim 5 in which the optical engine includes an imager selected from one of light emitting diode, liquid crystal on silicon device, organic light emitting diode array, or micro-electro mechanical system device.

8. The electronic device of claim 7 in which the imager is configured to operate using raster scanning.

9. The electronic device of claim 5 in which one or more of the lenses include liquid crystal (LC) microlenses comprising floating electrodes and concentric electrodes wherein the floating electrodes are configured to fill gaps between the concentric electrodes when the one or more LC microlenses are electrically modulated.

10. The electronic device of claim 9 in which a given LC microlens in the array is mapped to one or more pixels in the out-coupling DOE based on a position of the one or more pixels in the out-coupling DOE.

11. The electronic device of claim 10 further including an array controller to set a focal depth for virtual images by controlling wavefront shape for one or more LC microlenses in the array that are mapped to pixels forming the virtual image.

12. The electronic device of claim 11 further including a gaze direction sensor configured to detect a gaze direction of the user, and controlling wavefront shape for one or more LC microlenses in the array that are along a detected gaze direction.

13. The electronic device of claim 12 in which the LC microlens includes a layer of LC material located between respective top and bottom substrates and further comprising a controller configured to electrically modulate the LC microlens to assume the particular wavefront shape to thereby impart focus to the out-coupled optical beams, the controller being adapted to apply an electric profile to various portions of the LC material layer through electrical contacts to the concentric electrodes.

14. The electronic device of claim 5 in which one or more lenses are configured to be infinitely variable between a range of optical powers.

15. A method for selectively providing variable focus to virtual images in an augmented reality display system that supports virtual images and real-world images, comprising:

receiving, from an imager, imaging light incorporating a virtual image at an in-coupling diffractive optical element (DOE) disposed in an exit pupil expander;

expanding an exit pupil of the received imaging light along a first coordinate axis in an intermediate DOE disposed in the exit pupil expander;

expanding the exit pupil along a second coordinate axis in an out-coupling DOE disposed in the exit pupil expander;

outputting the virtual images using the out-coupling DOE to an array of tunable liquid crystal (LC) microlenses, the output virtual images having an expanded exit pupil relative to the received light at the in-coupling DOE along the first and second coordinate axes; and electrically controlling one or more LC microlenses in the array to focus the virtual image on a virtual image plane, a location of the virtual image plane being at a selectively variable distance from the system based on the electrical control.

16. The method of claim 15 further including mapping pixels from the out-coupling DOE to LC microlenses in the array on a one-to-one basis or a many-to-one basis and controlling the one or more LC microlenses in the array to set focus of the virtual image based on the pixel mapping.

17. The method of claim 15 further including detecting a gaze direction of a system user and controlling LC microlenses to set focus of pixels of virtual images that intersect the detected gaze direction.

18. The method of claim 15 in which the electrically controlling comprises analog adjustability of LC material in the LC microlens between various wavefront shapes by application of power to an arrangement of electrodes in an LC microlens.

19. The method of claim 15 as performed in a near-eye display system.

* * * * *